US006621957B1

(12) United States Patent
Sullivan et al.

(10) Patent No.: US 6,621,957 B1
(45) Date of Patent: Sep. 16, 2003

(54) TEMPERATURE COMPENSATED OPTICAL DEVICE

(75) Inventors: James M. Sullivan, Manchester, CT (US); Timothy J. Bailey, Longmeadow, MA (US); Robert N. Brucato, Waterbury, CT (US); Thomas W. Engel, East Hampton, CT (US); Mark R. Fernald, Enfield, CT (US); Richard T. Jones, Hamden, CT (US); Alan D. Kersey, South Glastonbury, CT (US); Trevor MacDougall, Simsbury, CT (US); Matthew B. Miller, Glastonbury, CT (US); Martin A. Putnam, Cheshire, CT (US); Paul E. Sanders, Madison, CT (US); James S. Sirkis, Wallingford, CT (US)

(73) Assignee: CiDRA Corporation, Wallingford, CT (US)

( * ) Notice: Subject to any disclaimer, the term of this patent is extended or adjusted under 35 U.S.C. 154(b) by 12 days.

(21) Appl. No.: 09/699,940

(22) Filed: Oct. 30, 2000

Related U.S. Application Data

(63) Continuation-in-part of application No. 09/519,240, filed on Mar. 6, 2000, now abandoned.

(51) Int. Cl.[7] .................................................. G02B 6/34
(52) U.S. Cl. ............................ 385/37; 385/10; 385/13; 385/31; 385/92
(58) Field of Search ............................ 385/37, 10, 92, 385/41, 42, 13, 89, 34, 102, 31; 372/33, 34, 102, 6; 359/130, 573, 127, 566, 576

(56) References Cited

U.S. PATENT DOCUMENTS

| 4,593,969 A | 6/1986 | Goodman et al. ............ 385/37 |
| 4,636,031 A | 1/1987 | Schmadel, Jr. et al. ....... 385/37 |
| 4,725,110 A | 2/1988 | Glenn et al. .................. 359/3 |

(List continued on next page.)

FOREIGN PATENT DOCUMENTS

| EP | 0320990 | 6/1989 |
| EP | 0352751 | 1/1990 |
| EP | 0884614 | 6/1997 |
| EP | 0926517 | 6/1999 |
| WO | 9919755 | 4/1999 |

OTHER PUBLICATIONS

V.C. Lauridsen, et al, "Design of DFB Fibre Lasers", Electronic Letters, Oct. 15, 1998, vol. 34, No. 21, pp 2028–2030.

(List continued on next page.)

*Primary Examiner*—Georgia Epps
*Assistant Examiner*—M. Hasan

(57) ABSTRACT

A temperature compensated optical device includes a compression-tuned glass element 10 having a Bragg grating 12 therein, a compensating material spacer 26 and an end cap 28 all held within an outer shell 30. The element 10, end cap 28 and shell 30 are made of a material having a low coefficient of thermal expansion (CTE), e.g., silica, quartz, etc. and the spacer 26 is made of a material having a higher CTE, e.g., metal, Pyrex®, ceramic, etc. The material and length L5 of the spacer 26 is selected to offset the upward grating wavelength shift due to temperature. As temperature rises, the spacer 26 expands faster than the silica structure causing a compressive strain to be exerted on the element 10, which shifts the wavelength of the grating 12 down to balance the intrinsic temperature induces wavelength shift up. As a result, the grating 12 wavelength is substantially unchanged over a wide temperature range. The element 10 includes either an optical fiber having at least one Bragg grating 12 impressed therein encased within and fused to at least a portion of a glass capillary tube or a large diameter waveguide (or cane) with a grating 12 having a core 11 and a wide cladding, which does not buckle over a large range of compressive axial strains. The element may have a "dogbone" shape to amplify compressive strain on the grating 12. The device 8 may also be placed in an axially tunable system that allows the wavelength to be dynamically tuned while remaining athermal. In addition to a grating, the device may be an athermal laser, DFB laser, etc. Also, the entire device 8 may be all made of monolithic glass materials.

71 Claims, 9 Drawing Sheets

U.S. PATENT DOCUMENTS

| | | | |
|---|---|---|---|
| 4,762,392 A | 8/1988 | Yamamoto et al. | 385/128 |
| 5,042,898 A | 8/1991 | Morey et al. | 385/37 |
| 5,367,589 A | 11/1994 | MacDonald et al. | 385/37 |
| 5,388,173 A | 2/1995 | Glenn | 385/37 |
| 5,469,520 A | 11/1995 | Morey et al. | 385/37 |
| 5,511,083 A | 4/1996 | D'Amato et al. | 372/6 |
| 5,519,801 A | 5/1996 | Le Noane et al. | 385/115 |
| 5,666,372 A | 9/1997 | Ball et al. | 372/6 |
| 5,691,999 A | 11/1997 | Ball et al. | 372/20 |
| 5,694,503 A | 12/1997 | Fleming et al. | 385/37 |
| 5,745,626 A | 4/1998 | Duck et al. | 385/96 |
| 5,757,540 A | 5/1998 | Judkins et al. | 359/341 |
| 5,771,251 A | 6/1998 | Kringlebotn et al. | 372/6 |
| 5,812,716 A | 9/1998 | Ohishi | 385/92 |
| 5,817,944 A | 10/1998 | Chung | 73/768 |
| 5,841,920 A | 11/1998 | Lemaire et al. | 385/37 |
| 5,844,667 A | 12/1998 | Maron | 356/35.5 |
| 5,914,972 A | 6/1999 | Siala et al. | 372/33 |
| 5,933,437 A | 8/1999 | Delavaux | 372/6 |
| 5,999,671 A | 12/1999 | Jin et al. | 385/37 |
| 6,016,702 A | 1/2000 | Maron | 73/705 |
| 6,018,534 A | 1/2000 | Pan et al. | 372/6 |
| 6,044,189 A | 3/2000 | Miller | 385/37 |
| 6,067,392 A | 5/2000 | Wakami et al. | 385/37 |
| 6,101,301 A | 8/2000 | Engelberth et al. | 385/37 |
| 6,108,470 A | 8/2000 | Jin et al. | 385/37 |
| 6,112,553 A | 9/2000 | Poignant et al. | 65/41 |
| 6,118,914 A | 9/2000 | Davis et al. | 385/37 |
| 6,144,789 A * | 11/2000 | Engelberth et al. | 385/37 |
| 6,147,341 A * | 11/2000 | Lemaire et al. | 385/37 |
| 6,181,851 B1 | 1/2001 | Pan et al. | 385/37 |
| 6,229,827 B1 * | 5/2001 | Fernald et al. | 372/20 |
| 6,243,527 B1 * | 6/2001 | Dawson-Elli | 385/136 |

OTHER PUBLICATIONS

P. Varming, et al, "Erbium Doped Fiber DGB Laser With Permanent $\pi/2$ Phase–Shift Induced by UV Post–Processing", IOOC'95, Tech. Digest, vol. 5, PD1–3, 1995.

Pan, J.J., "166–MW Single–Frequency Output Power Interactive Fiber Lasers with Low Noise", IEEE Photonics Technology Letters, vol. 11, No. 1, Jan. 1999.

* cited by examiner

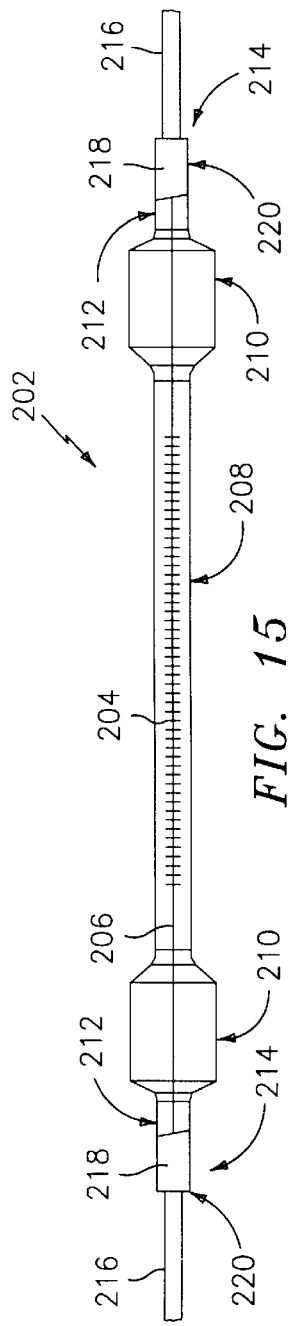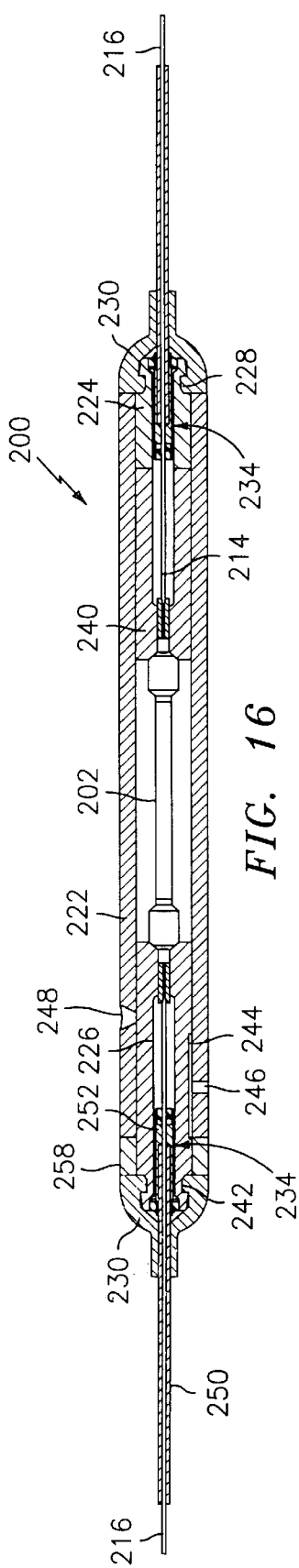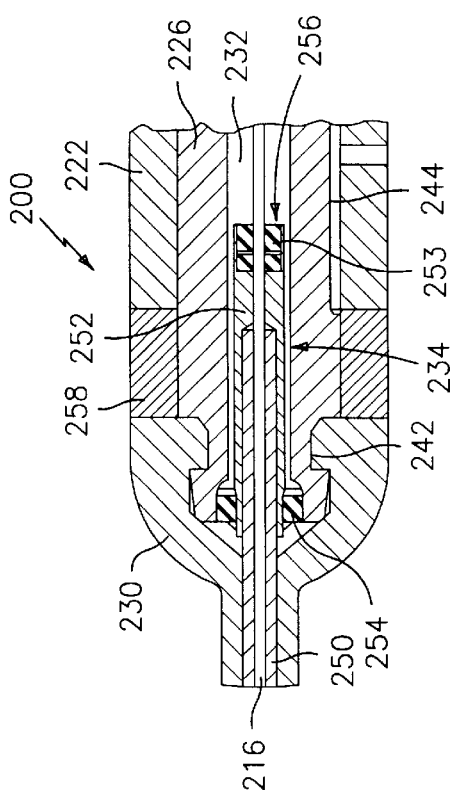

US 6,621,957 B1

TEMPERATURE COMPENSATED OPTICAL DEVICE

CROSS REFERENCES TO RELATED APPLICATIONS

This is a continuation-in-part of U.S. patent application, Ser. No. 09/519,240, now abandoned, filed Mar. 6, 2000, which is hereby incorporated herein by reference in its entirety.

TECHNICAL FIELD

The present invention relates to an optical device, and more particularly to a temperature compensated optical device.

BACKGROUND ART

It is known that a fiber Bragg grating may be passively mechanically temperature compensated so as to be "athermal", i.e., substantially insensitive to changes in temperature, such as that described in U.S. Pat. No. 5,042,898, entitled "Incorporated Bragg Filter Temperature Compensated Optical Waveguide Device", to Morey, et al. However, such techniques require complicated mechanical packaging and are costly to manufacture. Also, such techniques may exhibit optical fiber attachment problems such as creep and hysteresis. Further, such techniques do not provide the ability to easily dynamically tune the grating wavelength to a desired wavelength.

Alternatively, it is also known to actively adjust the strain on a grating to compensate for changes in temperature, such as by using a closed loop controller that measures temperature and adjusts the strain on the grating accordingly. However, such techniques require active components to compensate for temperature changes, which increase complexity and cost and reduce reliability of the device.

Thus, it would be desirable to have a optical Bragg grating based package that is substantially insensitive to changes in temperature that has a simple construction and has low manufacturing cost.

SUMMARY OF THE INVENTION

Objects of the present invention includes provision of a passive optical a thermal package that has a simple construction and is low cost.

According to an embodiment of the present invention, a temperature compensated optical device comprises an optical element having at least one grating disposal therein along a longitudinal axis of said optical element the grating has a characteristic wavelength that varies with ambient temperature and upon the exertion of axial compressive force applied to the optical element the optical element is made of an element material having an element coefficient of thermal expansion (CTE). A spacer is disposed adjacent to an axial end of said optical element and made of a spacer material having a spacer CTE and that is larger than the element CTE. A housing is arranged with the spacer and the optical element such that at least a portion of the spacer and the optical element are in compression over an operational temperature range. The housing has a housing CTE that is less than said spacer CTE. Further, the characteristic wavelength changes less than a predetermined amount over said operational temperature range.

According to another embodiment of the present invention, a temperature compensated optical device comprises an optical waveguide having a cladding and a core disposed along a longitudinal axis of the optical waveguide. The optical waveguide further includes at least one grating disposed within the core. The grating has a characteristic wavelength that varies with ambient temperature and upon the exertion of axial compressive force applied to the optical waveguide. The optical waveguide is of a material having a waveguide coefficient of thermal expansion (CTE). At least a portion of the cladding and the core of the optical waveguide have a transverse cross-section, which is continuous and is formed of substantially the same material. The at least portion of the cladding and the core of the optical waveguide have an outer transverse dimension of at least 0.3 mm. A compression device includes a first member and a second member. The first member includes a material having a first coefficient of thermal expansion (CTE), the second member including a material having a second coefficient of thermal expansion (CTE) that is different than the first CTE of the first member. The first and second members are arranged in thermally compensating relationship with the optical waveguide such that the characteristic wave length is maintained within a predetermined wavelength range over an ambient temperature range.

According to another embodiment of the present invention, a temperature compensated optical device comprises an optical waveguide having a cladding and a core disposed along a longitudinal axis of the optical waveguide. The optical waveguide further including at least one grating disposed within the core. The grating has a characteristic wavelength that varies with ambient temperature and upon the exertion of axial compressive force applied to the optical waveguide. The optical waveguide is of a material having a waveguide coefficient of thermal expansion (CTE). At least a portion of the cladding and the core of the optical waveguide have a transverse cross-section, which is continuous and is formed of substantially the same material. The at least portion of the cladding and the core of the optical waveguide has an outer transverse dimension of at least 0.3 mm. A compression device includes a first member and a second member. The first member includes a material having a first coefficient of thermal expansion (CTE). The second member includes a material having a second coefficient of thermal expansion (CTE) that is different than the first CTE of the first member. The compression device strains the optical waveguide in response to a change in ambient temperature such that the characteristic wavelength is maintained within a predetermined wavelength range over an ambient temperature range.

According to another embodiment of the present invention, a temperature compensated optical device comprises an optical waveguide having a cladding and a core disposed along a longitudinal axis of the optical waveguide. The optical waveguide further includes at least one grating disposed within the core. The grating has a characteristic wavelength that varies with ambient temperature and upon the exertion of axial compressive force applied to the optical waveguide. The optical waveguide is of a material having a waveguide coefficient of thermal expansion (CTE). The optical waveguide comprises an optical fiber having the grating embedded therein and a tube having the optical fiber and the grating encased therein along a longitudinal axis of the tube. The tube is fused to at least a portion of the optical fiber. A compression device includes a first member and a second member. The first member includes a material having a first coefficient of thermal expansion (CTE). The second member includes a material having a second coefficient of thermal expansion (CTE) that is different than the first CTE of the first member. The first and second members are arranged in thermally compensating relationship with the optical waveguide such that the characteristic wavelength is maintained within a predetermined wavelength range over an ambient temperature range.

According to another embodiment of the present invention, a temperature compensated optical device comprises an optical waveguide having a cladding and a core disposed along a longitudinal axis of the optical waveguide. The optical waveguide further includes at least one grating disposed within the core. The grating has a characteristic wavelength that varies with ambient temperature and upon the exertion of axial compressive force applied to the optical waveguide. The optical waveguide is of a material having a waveguide coefficient of thermal expansion (CTE). The optical waveguide includes a pair of opposing axial surfaces. At least a portion of the cladding and the core of the optical waveguide has a transverse cross-section, which is continuous and is formed of substantially the same material. A compression device includes a first member and a second member, The first member includes a material having a first coefficient of thermal expansion (CTE). The second member includes a material having a second coefficient of thermal expansion (CTE) that is different than the first CTE of the first member. The first and second members are arranged in thermally compensating relationship with the optical waveguide such that the characteristic wavelength is maintained within a predetermined wavelength range over an ambient temperature range.

According to another embodiment of the present invention, a temperature compensated optical device comprises an optical waveguide having a cladding and a core disposed along a longitudinal axis of the optical waveguide. The optical waveguide further includes at least one grating disposed within the core. The grating has a characteristic wavelength that varies with ambient temperature and upon the exertion of axial compressive force applied to the optical waveguide. The optical waveguide is of a material having a waveguide coefficient of thermal expansion (CTE). The optical waveguide has an outer transverse dimension such that the optical waveguide will not buckle over an operational temperature range. At least a portion of the optical waveguide has a transverse cross-section which is continuous and made of substantially homogeneous material. A compression device includes a first member and a second member. The first member includes a material having a first coefficient of thermal expansion (CTE). The second member includes a material having a second coefficient of thermal expansion (CTE) that is different than the first CTE of the first member. The first and second member are arranged in thermally compensating relationship with the optical waveguide such that the characteristic wavelength is maintained within a predetermined wavelength range over an ambient temperature range.

The present invention provides a substantial improvement over the prior art by providing an Bragg grating device that passively mechanically compensates for changes in temperature such that the grating wavelength does not substantially change over a predetermined temperature range. Also, the invention may contain one or more Bragg gratings, a pair of Bragg gratings configured as a Fabry Perot interferometer or resonator or Bragg grating reflector laser, a distributed feedback (DFB) laser, or an interactive laser, that exhibits minimal changes over temperature (e.g., <50 picometers). The invention may be used as a very stable grating wavelength reference over temperature. Alternatively, the invention may be tuned to the desired wavelength at which to behave athermally. Further, the invention temperature compensates the grating passively, i.e., without any active components or feedback control loops, thereby reducing complexity and cost.

The foregoing and other objects, features and advantages of the present invention will become more apparent in light of the following detailed description of exemplary embodiments thereof.

BRIEF DESCRIPTION OF THE DRAWINGS

FIG. 15 is a side view of an optical waveguide having a pair of pigtail assemblies coupled to the ends thereof, in accordance with the present invention.

FIG. 16 is a side cross-sectional view of another embodiment of an athermal device, in accordance with the present invention.

FIG. 17 is an expanded cross-sectional view of portion of the athermal device of FIG. 16, in accordance with the present invention.

BEST MODE FOR CARRYING OUT THE INVENTION

Figure 1:
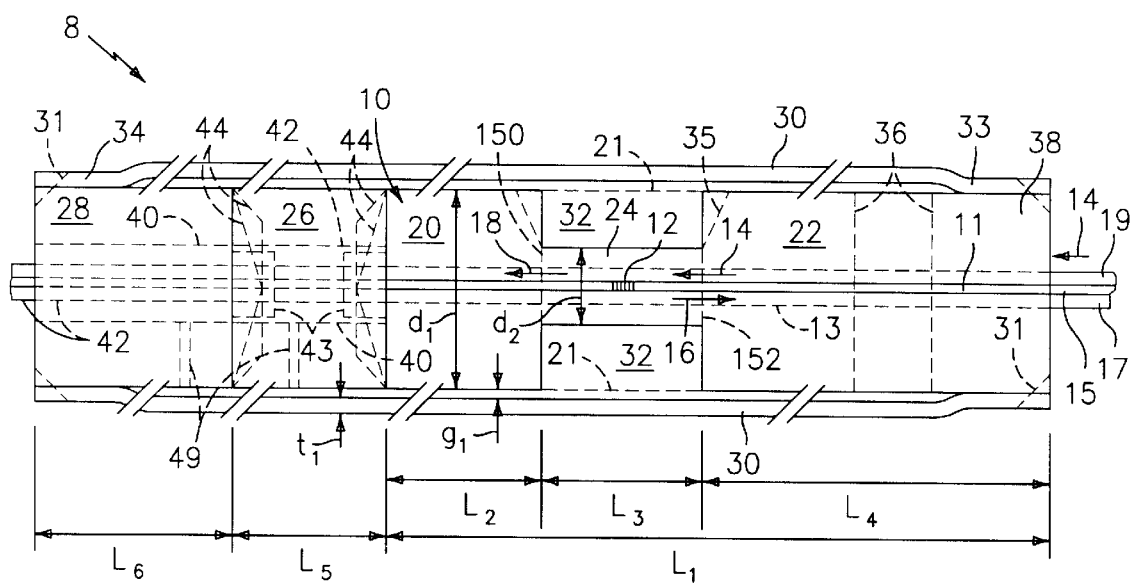
FIG. 1 is a side cross-sectional view of an athermal optical device having a Bragg grating therein, in accordance with the present invention.

A temperature compensated ("athermal") optical device includes an inner glass element 10 having a single or few mode inner core 11 and having a Bragg grating 12 impressed (or embedded or imprinted) therein. The element 10 comprises silica glass ($SiO_2$) having the appropriate dopants to allow light 14 to propagate along a core 11. The Bragg grating 12, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

However, any wavelength-tunable grating or reflective element embedded, etched, imprinted, or otherwise formed in the element 10 that has a characteristic wavelength that varies with changing temperature may be used if desired. As used herein, the term "grating" means any of such reflective elements. Further, the reflective element (or grating) 12 may be used in reflection and/or transmission of light.

The element 10 may be made of a glass material, such as silica, fused silica, quartz, or other glasses. The light 14 is incident on the grating 12 which reflects a portion thereof as indicated by a line 16 having a predetermined wavelength band of light centered at a reflection wavelength $\lambda_b$, and passes the remaining wavelengths of the incident light 14 (within a predetermined wavelength range), as indicated by a line 18.

The grating 12 may be formed in a large diameter waveguide, e.g., cane, such as that described in Commonly-owned Co-pending U.S. patent application, Ser. No. 09/455,868, entitled "Large Diameter Optical Waveguide, Grating and Laser", filed Dec. 6, 1999.

Alternatively, the grating 12 may be formed in an optical fiber and encased within and fused to at least a portion of a cylindrical glass capillary tube (see FIG. 14), such as that described in copending U.S. patent application, Ser. No. 09/455,865, entitled "Tube Encased Fiber Grating", filed Dec. 6, 1999. In that case, the glass tube is made of substantially the same material as the fiber such that the tube (or the inner diameter surface of a bore hole in the tube) can be fused to (i.e., create a molecular bond with, or melt together with) the outer surface (or cladding) of the optical fiber such that the interface surface between the inner diameter of the tube and the outer diameter of the fiber become substantially eliminated (i.e., the inner diameter of the tube cannot be distinguished from the cladding of the fiber), this interface is indicated by a dashed line 13.

In either case, whether a large diameter waveguide or a tube encased fiber is used, the glass material outside the core 11 acts like a large cladding region, as discussed in the aforementioned copending patent applications. The tube-encased grating and the large diameter waveguide grating have substantially the same composition and properties in the locations where the tube is fused to the fiber, because the end (or transverse) cross-section of the tube-encased grating 12 and the large diameter waveguide grating are contiguous (or monolithic) and made of substantially the same material across the cross-section, e.g., a glass material, such as doped and undoped silica. Also, in these locations both have an optical core and a large cladding.

In either case, the optical element 10 diameter d2 is set such that the element 10 will not buckle over the desired grating wavelength tuning range, which requires the outer diameter of the element to be at least about 0.3 mm, as discussed in the aforementioned patent applications.

An optical fiber 19 having a core 15 and a cladding 17 may be connected to and/or exits from the element 10 to couple light 14 into and/or out of the element 10. If a large diameter waveguide is used, the optical fiber 19 is spliced or otherwise optically coupled to one or both axial ends of the element 10 using any known or yet to be developed techniques for splicing fibers or coupling light from an optical fiber into a larger waveguide, that provides acceptable optical losses for the application. If a tube encased fiber is used, the fiber 19 enters/exits the element 10 from one or both axial ends and is collapsed and fused to a glass tube.

The element 10 has a cylindrical shape and has axial ends 20,22 having a diameter d1 of about 3 mm and a smaller middle section 24 having a smaller diameter d2 of about 1 mm where the grating 12 is located. Other diameters, dimensions and geometries may be used if desired to provide mechanical strain on the grating 12 embedded in the element 10. The element 10 has the shape of a "dogbone", such as that described in the aforementioned copending U.S. patent application, Ser. No. 09/455,865, entitled "Tube Encased Fiber Grating", filed Dec. 6, 1999, U.S. Pat. No. 6,229,827 entitled "Compression Tuned Bragg Grating and Laser", filed Dec. 6, 1999, and U.S. patent application Ser. No. 09/455,868, entitled "Large Diameter Optical Waveguide, Grating and Laser", filed Dec. 6, 1999, which are incorporated herein by reference in their entirety, and all of the alternative embodiments described therein. Alternatively, instead of the dogbone shape the element 10 may have a straight geometry as indicated by the dashed lines 21. In that case, the diameter of the element 10 may be that of d2 or d1, depending on the desired design criteria. The dogbone shape helps to enhance or amplify the compressive strain on the grating 12 while providing a large surface area to push on, as described in the aforementioned patent applications.

A compensating material spacer 26 (or slug or pellet) has one axial end disposed against an axial end of the glass element 10 and the other end axially disposed against an end cap 28. The spacer 26 has a diameter d1 substantially the same as that of the element 10 and a length L5 (e.g., 1.1 in.) which is set to provide the necessary mechanical compensation over temperature, discussed more hereinafter. However, the diameter of the spacer 26 and that of the element 10 and that of the end cap 28 need not all be the same, provided the spacer 26 provides the required mechanical strain compensation over temperature on the element 10, discussed more hereinafter. The spacer 26 may have a hole 40 disposed axially along the spacer 26.

Alternatively, the spacer 26 may be located on the other side or on both axial ends of the glass element 10, as indicated by the dashed lines 36. In that case, there would be an end cap 38 between the spacer and the element 10.

An outer glass tube or shell 30 is fused or otherwise rigidly attached at one axial end 33 to the axial end 22 of the element 10 and the other axial end 34 of the outer shell 30 is rigidly attached to the end cap 28. The shell 30 forms an inner cavity 32 between the shell 30 and portions of the element 10, the spacer 26, and the end cap 28. The gap g1 between the shell 30 and the element 10 is about 50 microns and the thickness t1 of the shell 26 is about 0.5 mm.

The spacer 26 and/or the end cap 28 may have an axial hole 40 therethrough. The hole 40 may be used to allow a second fiber 42 which may be connected to the element 10 to pass through it an exit the device to provide a two sided pass-through device.

Instead of having flat or flush contact surfaces between the spacer 26 and the element 10 and the end cap 28, the end cap 28 and element 10 may have a conical protrusion and the slug 26 may have conical seats 44 that mate therewith, for alignment purposes and/or to reduce the possibility of cracking or for other reasons. Also, the axial ends of the device 8 may have beveled corners 31 to allow for seating with another part or device, such as in an actuation system like that described in FIG. 11, discussed hereinafter. Also, the inner edges of the "dogbone" need not be vertical as indicated by lines 35.

The element 10 and the end cap 28 are made of a low CTE material, such as quartz, silica, or low CTE ceramic, or other low CTE material. The spacer 26 is made of a material having a higher CTE than that of the element 10, e.g., metal, Pyrex®, high CTE ceramic, etc. The coefficients of thermal expansion (CTEs) and lengths of the element 10, the end cap 28, the outer shell 30, and the spacer 26 are selected such that the reflection wavelength of the grating 12 does not substantially change over a predetermined temperature range. More specifically, the length L5 of the spacer 26 is sized to offset the upward grating wavelength shift due to temperature. As the temperature increases, the spacer length expands faster than the glass element 10, which shifts the grating wavelength down to balance the intrinsic wavelength shift up with increasing temperature.

For example, if the element is 4 cm long and made of silica and the spacer 26 length L5 is 1 cm long. The CTE for silica is $0.5 \times 10^{-7}$/C and the "apparent strain" induced by the glass grating is dn/dT is approximately equivalent to a CTE of about $7 \times 10^{-6}$/C. Thus, if the spacer 26 is made of a material with a CTE of about $3 \times 10^{-5}$, the net wavelength shift of the grating over temperature will be near zero, i.e., the device is substantially compensated for temperature (i.e., athermal).

It is possible for the entire device to be all made of monolithic glass materials. For example, if the element 10, end cap 28, and shell 30 are all made of silica or quartz and the spacer 26 is made of Pyrex® (or other glass having a CTE larger than silica or quartz) and the element 10 and the end cap 28 each have a protrusion or nub 43 that fits inside the hole 40 of the spacer 26 and then the spacer 26 is collapsed and fused onto the nubs 43. Alternatively, the glass spacer 26 may be fused to only one of the element 10 or the end cap 28.

Figure 2:
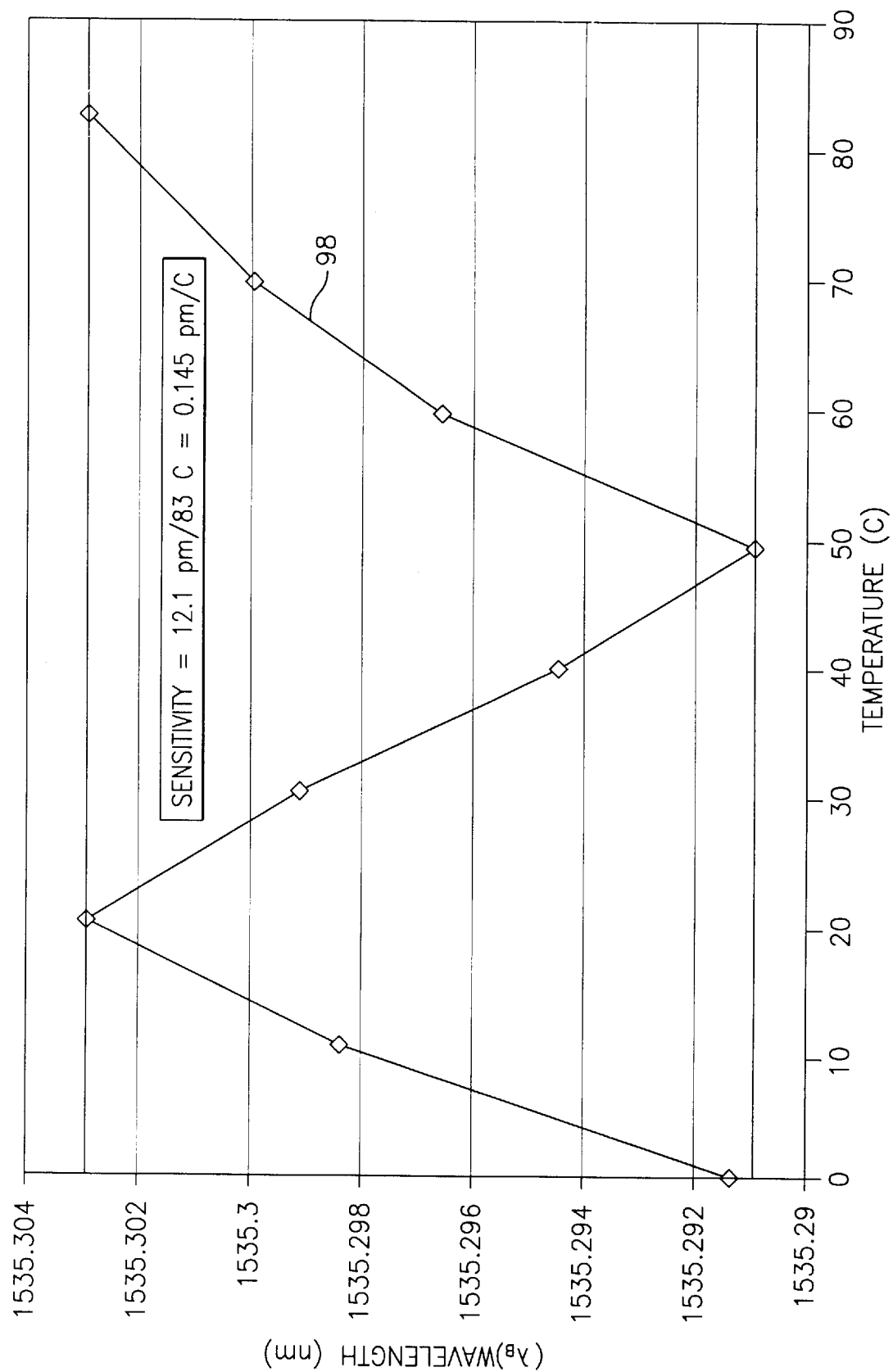
FIG. 2 is a graph of grating wavelength error over temperature for the athermal optical device of FIG. 1 having a pair of Bragg gratings therein, in accordance with the present invention.
Figure 3:
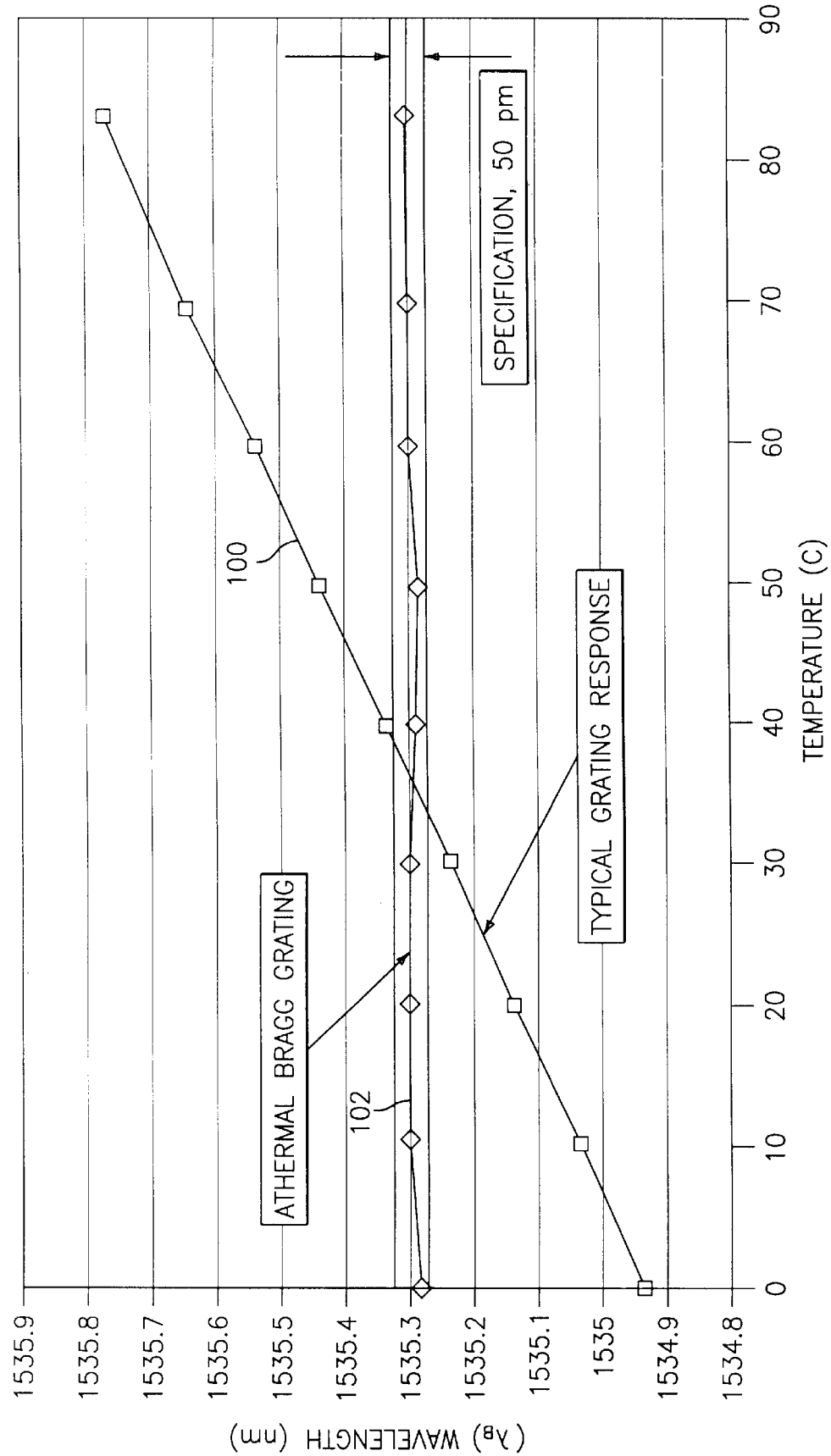
FIG. 3 is a graph of wavelength error over temperature for the athermal optical device of FIG. 1 having a pair of Bragg gratings therein, in accordance with the present invention.

Referring to FIG. 2, in particular, a curve 98 shows the shift in the grating reflection wavelength $\lambda b$ over a temperature range of 0 to 83 Deg. C. has a variation of about 12.1 picometers, or about 0.145 pm/Deg.C. for the athermal grating package of FIG. 1. Referring to FIG. 3, a curve 100 shows the shift of the grating reflection wavelength $\lambda b$ of an typical uncompensated grating over temperature. A curve 102 plots the points from the curve 98 (FIG. 2) on a larger scale and shows that the variation over temperature is well within a 50 pm range (which is a typical current specification in the industry for an athermal grating).

For the data of FIGS. 2 and 3, the element 10, the end cap 28 and the outer shell 30 are made of a fused silica having a coefficient of thermal expansion (CTE) of about 0.5 ppm/deg. C. The overall length L1 of the element 10 is about 1.3 in. (where the length L2 of the large section 20 is about 0.5 in., the length L4 of the other large element 22 is about 0.5 in., the length L3 of the smaller section 24 is about 0.3 in.), the length L5 of the spacer 26 is about 1.1 in., and the length L6 of the end cap 28 is about 3 in. The lengths L2 and L4 need not be the same length. The spacer 26 is made of aluminum and has a CTE of about 22.4 ppm/Deg.C. Other materials and lengths may be used for the compensating material spacer 26 if desired.

Figure 13:
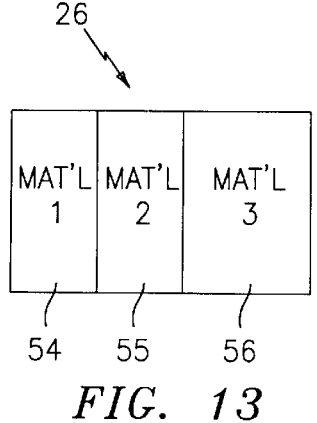
FIG. 13 is a side view of a compensation material spacer having materials with different Coefficients of Thermal Expansions (CTEs), in accordance with the present invention.

Referring to FIG. 13, instead of the compensating material spacer 26 being made of one material having a single CTE, the spacer 26 may comprise a plurality of materials 54,55,56 stacked axially to provide the desired overall CTE response characteristics. Such a technique may be used if a more complex or non-linear response over temperature is desired, e.g., such as to compensate for dn/dT effects or for other reasons.

The element 10, when fully assembled in final form, is placed in an initial pre-compression to allow the device to function optimally. In particular, an initial pre-compression of the element 10 may be achieved in various different ways, discussed more hereinafter. For FIG. 1, the spacer 26 may be cooled down to a predetermined temperature to shrink the spacer 26. Any technique for cooling the spacer 26 may be used, such as using a pressurized super-cooling liquid (e.g., liquid nitrogen, helium, freon, or other freezing or cryogenic means). Then the outer shell 30 is fused to the end cap 28 while the spacer is frozen. The glass fusion can occur and not cause thermal shock to the device due to the length L6 of the end cap, e.g., 3 in., and the material (e.g., silica) which is not a good thermal conductor. When the device 8 all reaches equilibrium at room temperature, the expansion of the spacer 26 causes a compressive force to be placed on the element 10. Note that in this case, all the parts of the device 8 are in compression, except for the shell 30 that is in tension.

Alternatively, the shell 30 may be heated and axially compressed under a precise load to set the preload. Other techniques may be used to exert the initial compression on the element 10, some of which are discussed more hereinafter.

The collapsing and fusion of the shell to the end cap 28 and the end 22 of the element 10 may be performed with a CO2 laser, torch, or other techniques, such as is described in the aforementioned patent application. A vacuum may be used to help facilitate the collapse, but may not be required, depending on the thickness t1 and material of the outer shell 30. If a vacuum is used, a vacuum may be drawn from the left side using the hole 40. Natural imperfections between the surfaces of the element 10, the spacer 26 and the end cap 28 may be sufficient to allow a vacuum to be drawn in the cavity 32. Alternatively, a radial hole may be provided in the spacer 26 and/or the end cap 28 to facilitate drawing a vacuum in the cavity 32. When the collapse and fusion of the shell 30 is complete, the holes 40, 49 may be filled with a material to provide a seal from the environment the device, e.g., epoxy, polymer, etc. Alternatively, an external hermetic package (not shown) having the element inside the package may be used to seal the chamber 32 from the environment.

After assembly, if the temperature compensation of the device 8 does not meet the required performance, the stiffness of the end cap 28 can be increased by re-fusing the end cap 28 to the shell 30 at a distance closer to the spacer 26. This allows for precision adjustment of the final assembly, without requiring any disassembly.

Figure 4:
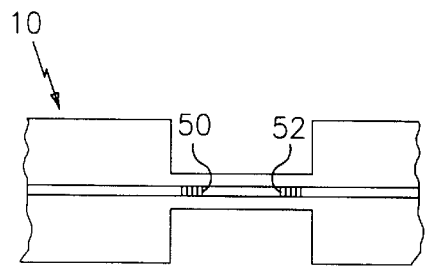
FIG. 4 is a side cross-sectional view of the athermal optical device of FIG. 1 having a pair of Bragg gratings therein, in accordance with the present invention.

Referring to FIG. 4, for any of the embodiments described herein, instead of a single grating located in the element, two or more gratings 50,52 may be embedded in the element 10. The gratings 50,52 may have the same reflection wavelengths and/or profiles or different wavelengths and/or profiles. The multiple gratings 50,52 may be used in a known Fabry Perot interferometric or resonator arrangement.

Further, one or more fiber lasers, such as that described in U.S. Pat. No. 5,666,372, "Compression-Tuned Fiber Laser" (which is incorporated herein by reference to the extent necessary to understand the present invention) may be embedded within the element 10 and temperature stabilized. In that case, the gratings 50,52 form a cavity and the portion of the element 10 at least between the gratings 50,52 (and may also include the gratings 50,52, and/or the element 10 outside the gratings, if desired) would be doped with one or more rare earth dopants, e.g., erbium and/or ytterbium, etc., and the lasing wavelength would be tuned accordingly as the axial force on the element 10 changes.

Figure 5:
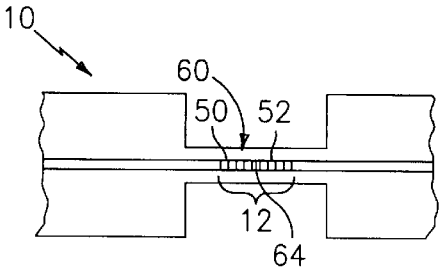
FIG. 5 is a side cross-sectional view of the athermal optical device of FIG. 1 having a DFB laser therein, in accordance with the present invention.

Referring to FIG. 5, another type of tunable fiber laser that may be used is a tunable distributed feedback (DFB) fiber laser 60, such as that described in V. C. Lauridsen, et al, "Design of DFB Fibre Lasers", Electronic Letters, Oct. 15, 1998, Vol.34, No. 21, pp 2028–2030; P. Varming, et al, "Erbium Doped Fiber DGB Laser With Permanent π/2 Phase-Shift Induced by UV Post-Processing", IOOC'95, Tech. Digest, Vol. 5, PD1-3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating is written in a rare-earth doped fiber and configured to have a phase shift of $\lambda/2$ (where $\lambda$ is the lasing wavelength) at a predetermined location 64 near the center of the grating 12 which provides a well defined resonance condition that may be continuously tuned in single longitudinal mode operation without mode hopping, as is known. Alternatively, instead of a single grating, the two gratings 50,52 may be placed close enough to form a cavity having a length of $(N+\frac{1}{2})\lambda$, where N is an integer (including 0) and the gratings 50,52 are in rare-earth doped fiber.

Alternatively, the DFB laser 60 may be located in the element 10 between the pair of gratings 50,52 (FIG. 4) where the element 10 is doped with a rare-earth dopant along at least a portion of the distance between the gratings 50,52. Such configuration is referred to as an "interactive fiber laser", such as is described in U.S. Pat. No. 6,018,534, entitled "Fiber Bragg Grating DFB-DBR Interactive Laser and Related Fiber Laser Sources", to Pan et al. Other single or multiple fiber laser configurations may be disposed in the element 10 if desired.

In the case (discussed herein before) where the element 10 is formed from collapsing and fusing a glass capillary tube onto an optical fiber, the optical fiber and/or the grating 12 may be fused to the tube having an initial pre-strain on the fiber and/or grating 12 (compression or tension) or no pre-strain. For example, if Pyrex® or another glass that has a larger CTE than that of the silica fiber is used for the tube, when the tube is heated and fused to the fiber and then cooled, the grating 12 is put in compression by the tube. Alternatively, the fiber grating 12 may be encased in the tube in tension by putting the grating in tension during the tube heating and fusing process; by putting the tube under compression and fusing the fiber to the tube outside where the compression is applied, then released after the fusion is complete; or by heating and stretching the tube between points where the fiber is fused to the tube. Also, the fiber grating 12 may be encased in the tube having neither tension nor compression on the grating 12.

Figure 14:
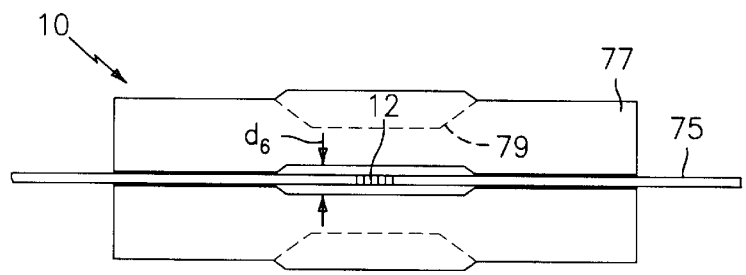
FIG. 14 is a side cross-sectional view of an optical element having a optical fiber fused to a capillary tube on opposite sides of a grating, in accordance with the present invention.

Referring to FIG. 14, an example of a tube-encased grating is shown where an optical fiber 75 is fused to a capillary tube 77 on opposite sides of the grating 12 such as that discussed in the aforementioned patent applications. In that case, the inner diameter d6 of the tube 77 is about 0.01 to 10 microns larger than the diameter of the optical fiber 75, e.g., 125.01 to 135 microns. Other diameters may be used; however, to help avoid fiber buckling when the tube 77 is axially compressed, the diameter d6 should be as close as possible to the fiber's 10 outer diameter. Also, the axial distance from the grating 12 to the fusion area need not be symmetric around both sides of the grating 12. Alternatively, the same result can be achieved by fusing two separate tubes (not shown) on opposite sides of the grating 12 and then fusing an outer tube across the tubes. Also, the tube 77 may have a "dogbone" shape as indicated by the dashed lines 79.

Also, a combination of a large diameter waveguide and the tube-encased grating may be used together to form any given embodiment of the optical element 10 described herein. In particular, one or more axial portion(s) of the element 10 may be a tube-encased grating or fiber and/or one or more other axial portion(s) may be a large diameter waveguide which are axially spliced or fused or otherwise mechanically and optically coupled together such that the core of the waveguide is aligned with the core of the fiber fused to the tube, such as is discussed in the aforementioned patent applications. For example, a central region 24 of the optical element may be the large waveguide and one or both axial ends may be the tube-encased fiber which are fused together as indicated by dashed lines 150,152, or visa versa (FIG. 1).

Figure 6:
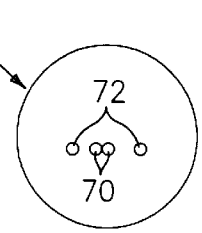
FIG. 6 is an end cross-sectional view of the athermal optical device of FIG. 1 having more than one core therein, in accordance with the present invention.

Referring to FIG. 6, alternatively, two or more cores may be located in the element 10, and each core may have at least one grating therein. The cores may be touching as indicated by the cores 70 or spaced apart as indicated by the cores 72 by a predetermined distance. The distance may be any desired distance between the cores and have any orientation/location within the element 10.

Figure 7:
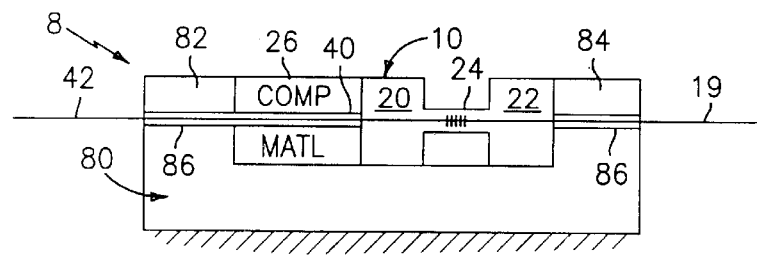
FIG. 7 is a side cross-sectional view of an athermal optical device having an alternative packaging configuration, in accordance with the present invention.

Referring to FIG. 7, instead of the fused outer shell 30 which holds the device together, the compensating material spacer 26 may be located in a housing 80 between opposite ends 82,84 thereof. There may be a hole 86 through the ends 82, 84 to allow for one or two fibers 19,42 to pass through.

The housing may be formed of a high strength metal or metal alloy material, preferably having a low CTE that is higher than silica, such as 400 Series stainless steel, titanium, nickel-iron alloys, such as Super Invar®, Carpenter Invar®, Free-Cut Invar® (registered trademarks of Carpenter Technology Corporation) containing various levels of carbon, manganese, silicon, nickel, cobalt and iron and selenium, or high strength, low CTE materials. While the housing is preferable formed of material having a low CTE, other material may be used having higher CTEs, such as nickel-based alloys, such as Inconel®, Incoloy®, and Nimonic® (registered trademarks of Inco Alloys International, Inc.) containing various levels of nickel, carbon, chromium, iron, molybdenum and titanium (e.g., Inconel 625). While a material having a relatively low CTE is preferred, one will appreciate and recognize that any high strength material, having a higher CTE, may be used with the understanding that the dimensions of the packaging (i.e., housing) is dependent on the CTE of the material.

Figure 8:
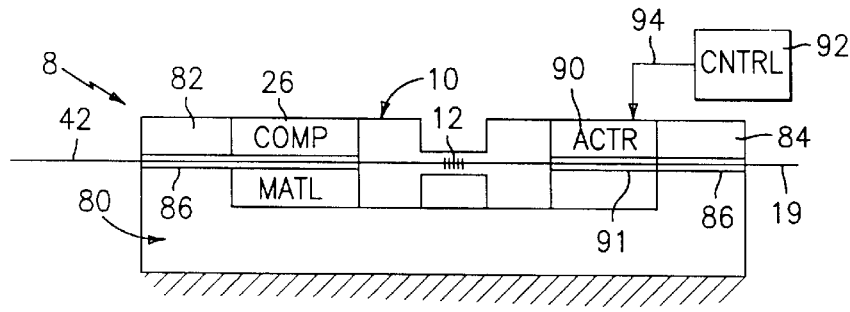
FIG. 8 is a side cross-sectional view of an athermal optical device having an actuator that provides tuning of the grating wavelength, in accordance with the present invention.
Figure 11:
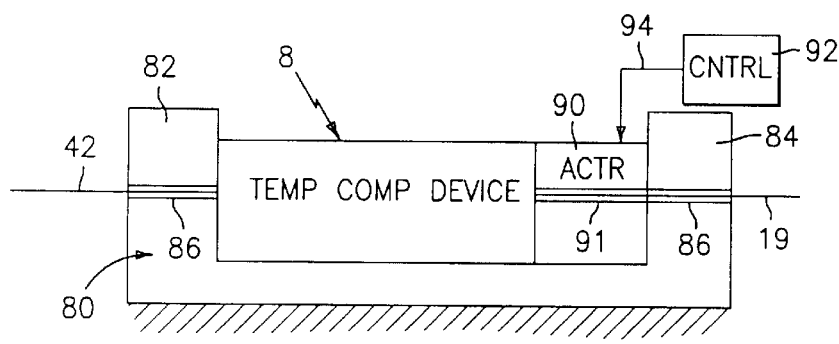
FIG. 11 is a side cross-sectional view of an athermal optical device having an actuator that provides tuning of an athermal package, in accordance with the present invention.

Referring to FIGS. 8 and 11, in addition to the invention holding a stable single wavelength over temperature, the invention also allows the desired wavelength to be tuned dynamically using an actuator 90, such as a piezoelectric (PZT) actuator, stepper motor with appropriate mechanical linkages (not shown), magnetostrictive device or any other technique that provides a compressive load on the element 10. The actuator 90 is responsive to a control signal on a line 94 from a controller 92. The actuator and controller 92 are similar to that described in the aforementioned copending U.S. Pat. No. 6,229,827, entitled "Compression Tuned Bragg Grating and Laser", filed Dec. 6, 1999. In that case, the element 10 is axially compressed by the actuator 90 to set the desired wavelength. The actuator 90 creates an axially compressive load on the element 10 that determines the optical grating wavelength or other similar tunable optical properties. Also, there may be a hole 91 through the actuator 90 for the fiber to pass through.

In FIG. 8, the actuator 90 compresses the element 10 directly and in FIG. 11, the actuator compresses a thermally compensated package 8 such as that shown in FIGS. 1,7,9, 10 or other thermally compensated packages capable of being axially compression tuned.

Figure 9:
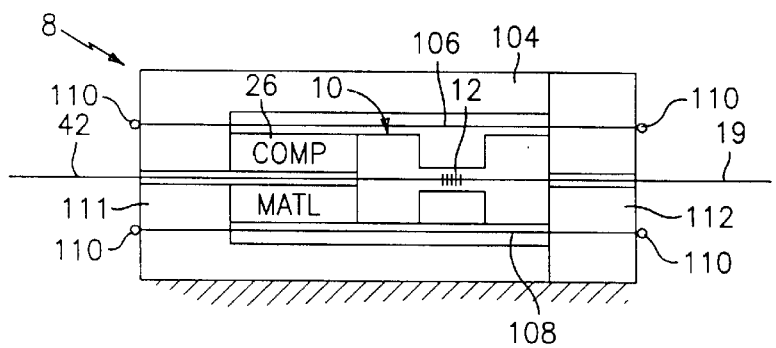
FIG. 9 is a side cross-sectional view of an athermal optical device having an alternative packaging configuration having wires, in accordance with the present invention.

Referring to FIG. 9, an alternative way to set the pre-compression is to have a left "C" shaped cross-sectional housing 111 and an end cap 112. The element 10 and compensating material spacer 26 are located inside the housing 111 and wires (e.g., piano wires) 106,108 are welded to the ends of the housing 111 and the end cap 112, as indicated by the dots 110. This configuration allows assembly to preset strain without epoxies, glues, or other adhesives and does not require a complicated process steps. Other configurations for the housing and end caps may be used together with a rigid wire to set the tensioning, such as two end caps and a central cylinder.

Figure 10:
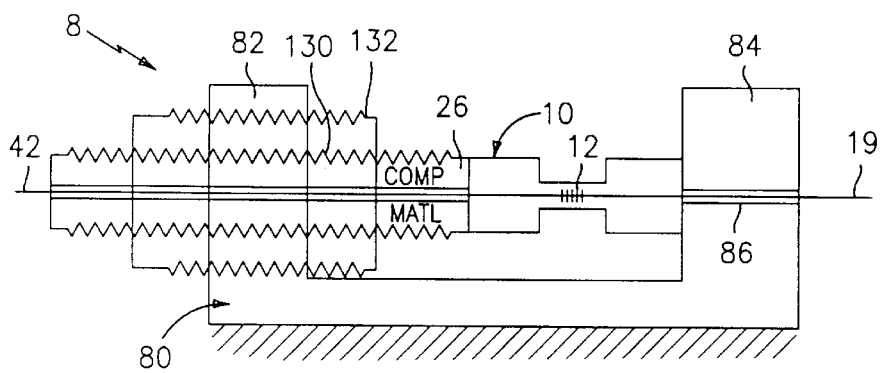
FIG. 10 is a side cross-sectional view of an athermal optical device having an alternative packaging configuration having variable pre-compression and variable compensation material length, in accordance with the present invention.

Referring to FIG. 10, an alternative way to set the pre-compression and the length of the compensating material spacer 26 is to use a small set screw 130 connected to or part of the spacer 26 which is threaded within a large set screw 132 that sets the pre-compressions. This arrangement allows for the length of the spacer 26 to be set for any desired pre-compression strain on the element 10.

Figure 12:
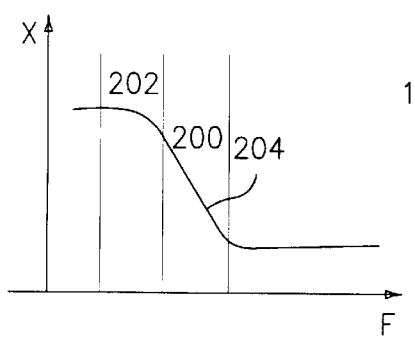
FIG. 12 is a graph of the spring properties of a portion of the optical device of FIG. 1, in accordance with the present invention.

Referring to FIG. 12, the device 8 is designed as a series of springs with the outer shell 30 as a spring in parallel with the end cap 28, the spacer 26 and the element 10. Using a compatibility equation, and balancing forces in the system, a predictable model was formulated to anticipate the wavelength shift of the grating 12 as a function of temperature. Depending on the application, it may be desirable to have the device 8 exhibit linear behavior over a certain temperature range. We have found that for the device 8 to exhibit linear behavior over the entire operational temperature range, the initial compressive force F on the element 10 should be set such that the element 10 behaves within the linear region 200 of the spring constant profile 204 of the element 10 over the entire operational temperature range. To do this, the initial pre-compressive axial force on the element 10 must be such that as the temperature decreases and the element and spacer contract in length, a sufficient force is maintained on the element over the operational temperature range of the element such that the element 10 does not enter into a non-linear region 202.

Referring to FIGS. 15 and 16, another embodiment of the athermal optical device 200 embodying the present invention is illustrated. The athermal device comprises a large diameter optical waveguide 202 (e.g., cane and collapsed tube) that is grounded to provide a generally "dogbone" shape, as described hereinbefore. The waveguide includes a midsection 208 disposed between a pair of axial ends 210. A Bragg grating 204 is disposed in the core 206 of the midsection 208 of the optical waveguide 202. In one embodiment, the waveguide 202 has an overall length of 22.6 mm, wherein the length of the midsection 208 is 14.4 mm and the length of the axial ends 210 are 2.7 mm each. The axial ends taper to the midsection at approximately 45 degrees. A nub 212 extends axially from each axial end 210 for coupling to respective optical pigtail assemblies 214. The axial ends 210 taper to the nubs 212 at approximately 60 degrees. The outer diameter of the axial ends of the waveguide 202 are approximately 2.0 mm, and the outer diameters of the midsection 208 and nubs 212 are approximately 0.8 mm. The ends of the nubs are cut and polished at an angle of approximately 9 degrees.

Each pigtail assembly 214 comprises a length of optical fiber 216 (i.e., SMF28) having a glass tube 218 epoxied to one end of the fiber to form the coupling end 220. The outer diameter of the tube 218 is approximately equal to the outer diameter of the nub 212 and the inner diameter is slightly greater than the outer diameter of the fiber 216 to permit epoxying of the fiber within the tube. The coupling ends 220 of the pigtail assemblies 214 are cut and polished at a complementary angle (i.e., 9 degrees) to the nubs 212. The coupling ends 220 of the pigtail tail assemblies are attached, such as by epoxy or fusion, to the angled ends of nubs of the optical waveguide 202. The complementary angled surfaces of the pigtail and waveguide help to reduce light reflecting back along the core 206 as a consequence of the waveguide/pigtail assembly interface.

The optical waveguide 202, attached pigtail assemblies 214, and a compensating spacer or rod 240 are disposed in a tubular housing 222 formed of a high strength metal or metal alloy material, preferably having a low CTE that is higher than silica, such as those described hereinbefore.

A fixed end cap 224 and an adjustable end cap 226, which are formed of similar material as the housing as described hereinbefore,) are welded in respective ends of the housing 222 to secure and maintain in axial alignment the optical waveguide and compensating spacer 240. The fixed end cap 224 has an outer diameter substantially the same as the inner diameter of the housing (i.e., 0.16 mm). An outer portion of the fixed end cap 224 extends outward from the end of the housing 222, and includes a circumferential groove 228 for receiving a strain relief boot 230, which will be described in greater detail hereinafter. Further, the fixed end cap 224 includes a bore 232 for receiving a strain relief device 234 and for passing the optical fiber 216 of the pigtail assembly 214 therethrough.

The compensating spacer or rod 240, as shown in FIG. 16, is disposed between the fixed end cap 224 and the optical waveguide 202. The outer diameter of the spacer 240 is slightly less than the inner diameter of the housing (i.e., 0.157 in.). The spacer 240 includes a stepped bore disposed axially for receiving the pigtail assembly 214 therethrough. One end of the spacer has an axial counter bore, that is frusta-conical in shape, to provide a seat for receiving and locating an axial end 210 and nub 212 of the optical waveguide 202. The nub 212 and the attached coupling end 220 of the pigtail assembly 214 are received in an inner portion of the bore, having a diameter approximately slightly greater than the outer diameter of the nub and coupling end. The stepped portion of the bore receives the optical fiber 216 of the pigtail assembly 214, and has a diameter greater than the inner portion of the bore of the spacer to assure that no contact occurs between the spacer and the fiber during expansion and contraction of the athermal device 200, as will be described hereinafter. The frusta-conical counter bore in the spacer 240 helps to align the waveguide 202 and the spacer 240 to thereby reduce the possibility of damage to the waveguide (i.e., cracking, buckling).

The spacer 240 is formed of a metal or metal alloy, such as steel, stainless steel, aluminum, high expansion alloy, such as High Expansion "19-2"®, High Expansion "22-3"®, High Expansion "72"®, (registered trademark of Carpenter Technology Corporation) containing various levels of carbon, manganese, silicon, chromium, nickel, iron, and copper, or other material having a higher coefficient of thermal expansion (CTE) than the housing 222. The CTEs and lengths of the optical waveguide, the end caps and the spacer are selected such that the reflection wavelength of the grating 204 does not substantially change over a predetermined temperature range (i.e., 100° C.). More specifically, the length of the spacer 240 is sized to offset the upward grating wavelength shift due to temperature and the thermal expansion of the housing, waveguide and end caps, as will be described hereinafter. As the temperature increases, the spacer length expands faster than the optical waveguide, which shifts the grating wavelength down to balance the intrinsic wavelength shift up with increasing temperature.

The adjustable end cap 226 supports and aligns the other end of the optical waveguide 202. Similar to the fixed end cap 224, the adjustable end cap 226 has an outer diameter substantially the same as the inner diameter of the housing 222 (e.g., 0.16 in.). The adjustable end cap 226 extends outward from the end of the housing, and includes a circumferential groove 242 for receiving another strain relief boot 230. Further, the adjustable end cap 226 includes a bore for receiving the strain relief device 234 and for passing the optical fiber 216 of the pigtail assembly 214 therethrough. The adjustable end cap 226, similar to the spacer 240, includes a stepped bore disposed axially for receiving the pigtail assembly 214 therethrough. One end of the adjustable end cap has an axial counter bore, that is frusta-conical in shape, to provide a seat for receiving and locating the other axial end 210 and nub 212 of the optical waveguide 202. The nub 212 and the attached coupling end 220 of the pigtail assembly 214 are received in an inner portion of the bore, having a diameter approximately slightly greater than the outer diameter of the nub and coupling end. The stepped portion of the bore receives the optical fiber 216 of the pigtail assembly 214, and has a greater diameter than the inner portion of the adjustable end cap 226. The larger diameter bore of the adjustable end cap assures that no contact occurs between the adjustable end cap and the fiber 216 during expansion and contraction of the athermal device 200, as will be described hereinafter. The frusta-conical counter bore in the adjustable end cap 226 helps to align the waveguide 202 and the adjustable end cap to thereby reduce the possibility of damage to the waveguide (i.e., cracking, buckling). The length of the adjustable end cap is longer than the fixed end cap 224. For example, the adjustable end cap is approximately 0.75 in., while the length of the fixed end cap is approximately 0.32 in.

Additionally, a pair of planar surfaces 244 are ground or formed in the outer surface of the adjustable end cap 226 to maintain the adjustable end cap in a fixed rotational orientation to the housing 222 and optical waveguide 202, during adjustment and mechanical burn-in process. The planar surfaces 244 are spaced radially at a predetermined angle (e.g., 120 degrees) and extend axially a predetermined length (i.e., 0.290 in.) to permit axial movement while maintaining the adjustable end cap 226 rotationally fixed. The planar surface align with a pair of holes 246 disposed in the housing 222, which are radially spaced 120 degrees. The holes 246 in the housing 222 receive a pair of spring loaded pins (not shown), which are disposed within a collar (not shown) mounted on the outer surface of the housing during assembly. The pins extend through the holes 246 to engage the planar surfaces 244 of the adjustable end cap 226, while the collar temporarily clamps the housing to the adjustable end cap.

During the assembly of the athermal device 200, an alignment tube (not shown) is first threaded through the housing 222 is used to align the waveguide, the compensating spacer 240 and the fixed end cap 224; and also provide a means to easily thread the fiber 216 of the pigtail assembly 214 through the spacer, the housing and the fixed end cap. Initially, the alignment tube is threaded through the housing. The spacer is then threaded over the tube, and the fiber 216 of the pigtail assembly 214 (attached to the waveguide 202) is threaded through the alignment tube. The spacer 240 and the waveguide 202 are then placed within the housing 222 to abut the fixed end cap 224 as the alignment tube is pulled from the fixed end cap. The adjustable end cap 226 is then threaded onto the fiber 216 of the other pigtail assembly 214 and inserted in the housing 222 to complete the assembly and the alignment of these components.

Once assembled, the adjustable end cap 226 is compressed by a device (not shown), which includes a stepper motor or PZT, to preload the optical waveguide 202 and set the reflection wavelength of the grating 204. While monitoring the light reflecting back from the grating, the adjustable end cap 226 is adjusted to tune the grating 204 to a selected wavelength. The housing 222 is then welded to the adjustable end cap 226. To accomplish the welding process, the housing includes a plurality of inwardly tapered holes 248 radially spaced around the housing 222. The tapered holes 248 are disposed forward of the planar surfaces 244 of the adjustable end cap 226 closer to the optical waveguide 202. During the welding process, the inner edges of each tapered bore 248 are spot welded to the adjustable end cap 226.

Prior to preloading the waveguide 202 and welding the adjustable end cap 226 to the housing 222, the athermal device 200 is subjected to a thermal and mechanical burn-in process. During the thermal burn-in process, the athermal device is placed within an oven and the temperature is cycled over a predetermined temperature range. During the mechanical burn-in process, an actuator (not shown) engages the adjustable end cap 226 and compresses and decompresses the waveguide 202 over a predetermined range for a predetermined number of cycles (e.g., 50 cycles). The burn-in processes mechanically and thermally work the interfaces between the components to stabilize the interfaces.

Referring to FIGS. 16 and 17, the athermal device 200 includes a strain relief assembly 234 mounted within both the fixed and adjustable end caps 224,226 for relieving strain to the pigtail assemblies at the waveguide/pigtail assembly interface; resulting from the thermal expansion and contraction of the housing 222, the end caps 224,226, the spacer 240 and the optical waveguide 202. Where the input/output optical fiber 216 is rigidly affixed to the housing 222, the strain relief assembly prevents pull forces from damaging the optical waveguide or separating/misaligning the pigtail/ waveguide interface. The problem with fixing the fiber 216 to the housing 222 is that large thermal expansion differences usually exist due to the extremely low TCE of the silica fiber. This mismatch causes strain to be imparted on the fiber as well as the pigtail assembly connection. If the housing 222 also experiences elastic deformations due to thermal expansion forces, this problem can be further exacerbated. The strain relief assembly 234 reduces or eliminates stress in the pigtail assembly caused by these thermal mismatches.

The strain relief assembly 234 comprises an outer sleeve 250 formed of a polymer (e.g., Hytrel®) epoxied within an expansion ferrule 252 formed of a metal, metal alloy or polymer, such as stainless steel, aluminum, polyimide and polymer composites, such as a polyetheretherketone (e.g., Peek 381G®, registered trademark of Vitrex USA Inc.), or other material having a TCE higher than the TCE of the optical waveguide 202. The ferrule 252 has a stepped bore whereby the diameter of a portion of the stepped bore is substantially the same as the outer diameter of the sleeve 250, and another portion of the stepped bore has a diameter substantially the same as the outer diameter of the optical fiber 216 of the pigtail assembly 214. The ferrule 252 includes a counter bore for receiving epoxy performs 253 having a "donut" shape. The strain relief assembly 234 is affixed to the respective end of the athermal device 200 by threading the optical fiber 216 through the bores of the expansion ferrule 252 and the outer sleeve 250. The outer end of the ferrule at 254 is attached to the adjustable end cap 226 by epoxy or other suitable means (i.e., welding). The athermal device 200 is then baked in an oven for a predetermined time at a predetermined temperature as required by the specifications of the epoxy performs 253 to attach the inner end 256 of the ferrule 252 to the fiber 216. The length of the ferrule 252 is determined by its material and the displacement of thermal expansion required to compensate for the mismatch of CTE of the components of the athermal device 202, as will be described in greater detail hereinafter.

One will recognize that the strain relief 234 may be unnecessary if the mismatch of the CTEs of the housing 222 and end caps 224,226 and the waveguide 202 is not substantial. In this case, a silica tube may be epoxied to the fibers 216 of the pigtail assemblies 214 which are then epoxied to the end caps 224,226.

To complete the assembly of the athermal device 200, a ring 258, having a width substantially equal to the distance between the end of the housing 222 and the strain relief boot 230, is placed over the adjustable end cap 226. The strain relief boots 230, which are formed of a polymer (e.g., Santoprene), are then snap fit into the grooves 228,242 of the end caps 224,226.

The manufacture and assembly of the athermal device 200 involves precise application of strain to the Bragg grating 204. During assembly, there is inherent settling of component interfaces that lead to unpredictable shifts in the center wavelength of the grating. To compensate for these shifts in the center wavelength, the athermal device 200 is finely tuned after assembly by plastically or otherwise deforming the housing to thereby achieve a selected amount of compression to the waveguide 202. The change in compressive force on the waveguide in turn adjusts the reflection wavelength of the Bragg grating. For example, the housing may be stretched to reduce the compression applied to the waveguide 202, and thereby increase the reflection wavelength of the grating 204.

One method of deforming the housing 222 is to roll circumferentially the outer surface of the housing, such as by compressing a blunt wheel onto the housing and rolling the wheel around the housing, to thereby stretch the housing. Other methods to stretch the housing include reflowing the material of the housing by heating the surface such as by a $CO_2$ laser, and crimping the housing using hydraulic force applied to the housing surface. Still another method for deforming the housing is shotpeening the surface, such as by blasting glass beads at the surface of the housing. It is important to note that initial tuning of center wavelength of the grating should be less than the desire center wavelength (e.g., −20 pm) to ensure the method of stretching the housing can be used. Alternatively, the housing may be compressed to deform the housing to increase the compressive force applied to the waveguide, thus resulting in a lowering of the reflection wavelength of the grating.

While deforming the housing 222 to tune the grating wavelength of an optical waveguide 202 in compression is shown, one will recognize and appreciate that a grating 204 of an optical waveguide in tension may also be tuned using this method of deforming the housing.

Figure 18:
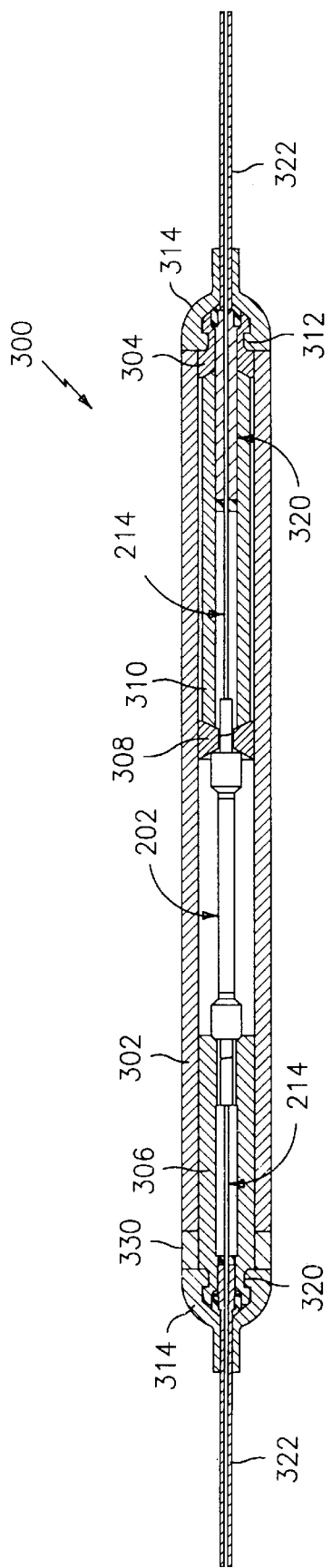
FIG. 18 is a side cross-sectional view of another embodiment of an athermal device, in accordance with the present invention.

Referring to FIG. 18, another embodiment of the athermal optical device 300 embodying the present invention is illustrated. The waveguide 202 and the pigtail assemblies 214 are the same as that shown in FIG. 15, and therefore, the reference numbers are the same. The athermal device 300 is illustrative of an embodiment having a housing 302, end caps 304,306, a compensator seat 308 and a thermal compensating spacer 310 having high CTEs. For example, the housing and end caps may be formed of titanium and the spacer may be formed of aluminum. Similar to the athermal device of FIGS. 15–17, a fixed end cap 304 is welded in one end of the housing 302. The inner surface of the fixed end cap 304 has a tapered recess that is frusta-conical in shape for receiving one end of the compensating spacer 310.

The compensating spacer 310 is suspended between the fixed end cap 304 and the compensator seat 308 to prevent the compensating spacer from contacting the inner surface of the housing 302. The compensator seat 308 is formed of similar material as the housing and end caps 304,306 (e.g., titanium). Both end surfaces of the seat 308 have a recess frusta-conical in shape for receiving an axial end 210 of the waveguide 202 at one end surface and the spacer 310 at the other end surface. The seat 310 includes an axial through-bore slightly greater than the nub 212 of the optical waveguide 202 and coupling end 220 of the pigtail assembly 214.

The compensating spacer 310 has an outer diameter that is less than the inner diameter of the housing 302 (i.e., 0.157 in.). The spacer includes an axial through-bore for receiving the optical fiber 216 of a pigtail assembly 214 therethrough. Both ends of the spacer 310 are complementarily tapered to rest within the respective recess of the fixed end cap 304 and the compensator seat 308, respectively.

The spacer 310 is formed of a metal material, such as aluminum, or other material having a higher coefficient of thermal expansion (CTE) than the housing 302, as described hereinbefore. The CTEs and lengths of the optical waveguide, the fixed end cap and the spacer are selected such that the reflection wavelength of the grating 204 does not substantially change over a predetermined temperature range. More specifically, the length of the spacer 310 is sized to offset the upward grating wavelength shift due to temperature change and the thermal expansion of the housing 302 and end caps 304,306. As the temperature increases, the spacer length expands faster than the optical waveguide 202, which shifts the grating wavelength down to balance the intrinsic wavelength shift up with increasing temperature.

The adjustable end cap 306 supports and aligns the other axial end 210 of the optical waveguide 202. Similar to the fixed end cap 304, the adjustable end cap 306 has an outer diameter substantially the same as the inner diameter of the housing 302 (i.e., 0.16 in.). The fixed end cap 304 extends from the end of the housing 302, and includes a radial groove 312 for receiving a strain relief boot 314. Further, the fixed end cap 304 includes a bore for receiving a strain relief device 314 and for passing the optical fiber 216 of the pigtail assembly 214 therethrough. The adjustable end cap 306 includes a stepped bore disposed axially for receiving the pigtail assembly therethrough. One end of the adjustable end cap has an axial counter bore, that is frusta-conical in shape, to provide a seat for receiving and locating the other axial end 210 and nub 212 of the optical waveguide 202. The nub 212 and the coupling end 220 of the pigtail assembly 214 are received in an inner portion of the bore, having a diameter approximately the same as the outer bore of the nub and coupling end. The stepped portion of the bore receives the optical fiber 216 of the pigtail assembly 214, and has a greater diameter than the inner portion of the adjustable end cap 306. The larger diameter bore of the adjustable end cap prevents contact between the adjustable end cap and the fiber when slack in the fiber occurs. The frusta-conical counter bore provides for alignment purposes and/or to reduce the possibility of cracking or for other reasons.

The adjustable end cap 306 is compressed axially by a device (not shown), which includes a stepper motor or PZT, to preload the optical waveguide 202 and set the reflection wavelength of the grating 204. While monitoring the light reflecting back from the grating, the adjustable end cap 306 is adjusted to tune the grating 204 to a selected wavelength. The housing 302 is then welded to the adjustable end cap 306. To accomplish the welding process, the housing 302 includes a pair of slots, extending longitudinally at the end of the housing approximate the adjustable end cap 306. During the welding process, the inner edges of each slot are spot welded to the adjustable end cap 306.

Figure 19:
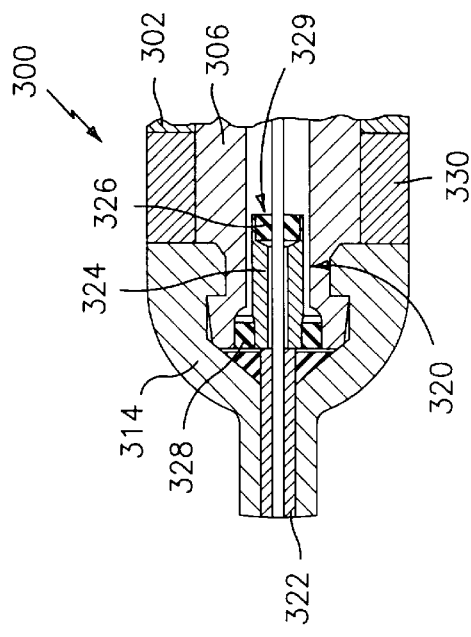
FIG. 19 is an expanded cross-sectional view of portion of the athermal device of FIG. 18, in accordance with the present invention.

Referring to FIGS. 18 and 19, the athermal device 300 includes a strain relief assembly 320 mounted within both the fixed and adjustable end caps 304,306 for relieving strain to the pigtail assemblies at the waveguide/pigtail assembly interface, resulting from the thermal expansion and contraction of the housing 302, the end caps 304,306, the spacer 310, the compensator seat 308 and the optical waveguide 202. Where the input/output optical fiber 216 is rigidly affixed to the housing 306, the strain relief assembly prevents pull forces from damaging the optical waveguide or separating/misaligning the pigtail/waveguide interface. As described hereinbefore, the strain relief assembly 320 reduces or eliminates stress in the pigtail assembly caused by these thermal mismatches.

The strain relief assembly 320 comprises an outer sleeve 322 formed of a polymer (e.g., Hytrel®) epoxied to an expansion ferrule 324 formed of a metal, metal alloy or polymer, having a TCE higher than the TCE of the optical waveguide 202, as described hereinbefore. The ferrule 324 has a bore having a diameter substantially the same as the outer diameter of the optical fiber 219 of the pigtail assembly 214. The ferrule 324 includes a counter bore for receiving epoxy performs 326 having a "donut" shape. The strain relief assembly 320 is affixed to the respective end of the athermal device 300 by threading the optical fiber 216 through the bores of the expansion ferrule 324 and the outer sleeve 322. The outer end of the ferrule at 328 is attached to the adjustable end cap 306 by epoxy or other suitable means (i.e., welding). The athermal device 300 is then baked in an oven for a predetermined time at a predetermined temperature as required by the specifications of the epoxy performs 326 to attach the inner end 329 of the ferrule to the fiber 216. The length of the ferrule 324 is determined by the material of the ferrule and the length of thermal expansion required to compensate for the mismatch of CTE of the components of the athermal device 300 as will be described in greater detail hereinafter.

To complete the assembly of the athermal device 300, a ring 330, having a width substantially equal to the distance between the end of the housing 302 and the strain relief boot 314, is placed over the adjustable end cap 306. The strain relief boots 314, which are formed of a polymer (e.g., Santoprene), are then snap fit into the grooves 304,312 of the end caps 304,306.

Figure 20:
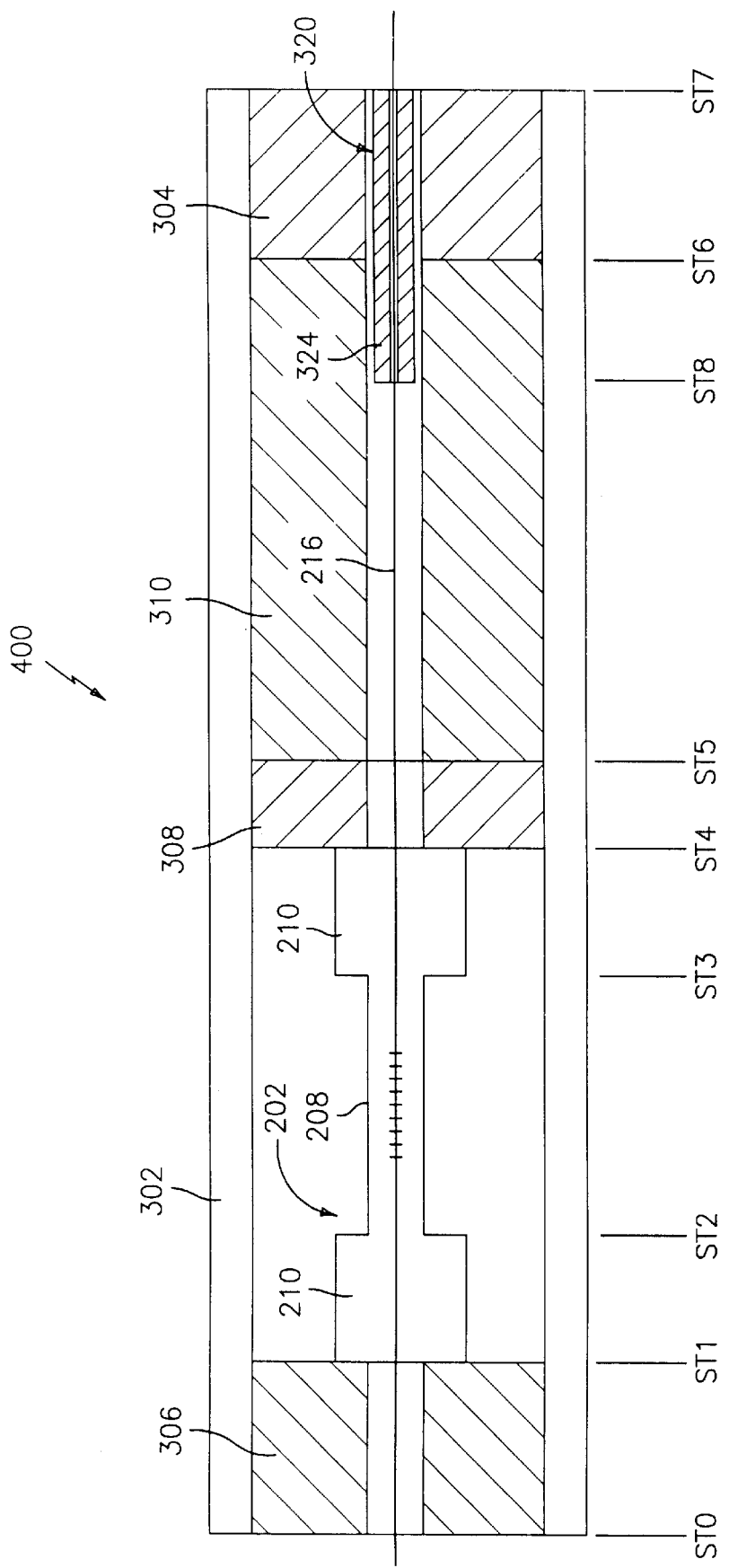
FIG. 20 is a simplified, side cross-sectional view of the athermal device of FIG. 18, in accordance with the present invention.

FIG. 20 shows a simplified embodiment 400 of the athermal device 300 of FIG. 18 to explain the thermal expansion and contraction of each component of the athermal device over a temperature range of 100° C. Therefore, the reference numbers of the simplified embodiment 400 are the same as the reference numbers of the components identified in FIG. 18.

As described hereinbefore, the length of the ferrule 324 is dependent on its material composition and the displacement of each component of the athermal device 400 over a predetermined temperature range. Specifically, to determine the necessary length of the ferrule 324 of the strain relief assembly 320 for providing strain relief to the fiber 216, both the thermal and elastic displacement of each component of the athermal device must be considered. The net displacement of each component can, therefore, be defined by the following equation:

$$\delta_{net} = \delta_t + \delta_e \quad (1)$$

wherein $\delta_t$ is the thermal displacement of the component and $\delta_e$ is the elastic displacement of the component.

The thermal displacement ($\delta_t$) of each component is determined by the following equation:

$$\delta_t = \gamma * \Delta T * L \quad (2)$$

wherein $\gamma$ represents the C.T.E. of the material of the component; $\Delta T$ is the temperature (°C.) delta; and L is the length ($\mu$m) of the component.

For example, the thermal displacement of the end caps 304,306, having a length of 6350.0 $\mu$m and formed of titanium having a Young's Modulus of 1.65E+07 and CTE of 8.70E-06, is 5.52 $\mu$m. The thermal displacement of the titanium compensator seat 310, having a length of 3175.0 $\mu$m, is 2.76 $\mu$m. The thermal expansion of each axial end 210 of the optical waveguide 202, having respective lengths of 3002.3 $\mu$m and formed of silica having a Young's Modulus of 1.05E+07 and CTE of 5.50E-07, is 0.17 $\mu$m. The thermal expansion of the intermediate portion 208 of the optical waveguide 202, having a length of 14010.6 $\mu$m, is 0.77 $\mu$m. The thermal expansion of the compensating spacer 308, having a length of 24130.0 µm and formed of aluminum, having a Young's Modulus of 1.00E+07 and CTE of 2.34E-05, is 0.17 µm. The thermal expansion of the titanium housing 302, having a length of 60020.2 µm, is 52.22 µm The elastic displacement ($\delta_e$) of each component is determined using the following equation:

$$\delta_e = P*L/(A*E) \quad (3)$$

wherein "P" (lbs) represents the resulting load on the housing 302; "L" represents the length (µm) of the component; "A" (µm$^2$) represents the outer area of the component; and "E" represents the Young's Modulus of the component.

The area (A) of each component is determined by the following equation:

$$A = (D_o^2 - D_i^2)*\pi/4 \quad (4)$$

wherein "$D_o$" represents the outer diameter of the component; and "$D_i$" represents the inner diameter of the component.

The resulting load (P) is determined by the following equation:

$$P = \frac{\delta_{ts} + \delta_{tc} + \delta_{ta} + \delta_{tp} + \delta_{ti} - \delta_{tb}}{\frac{L_s}{A_s*E_s} + \frac{L_c}{A_c*E_c} + \frac{L_a}{A_a*E_a} + \frac{L_p}{A_p*E_p} + \frac{L_i}{A_i*E_i} + \frac{L_b}{A_b*E_b}} \quad (5)$$

wherein the subscript "s" represents a parameter of the compensator seat 308; the subscript "c" represents a parameter of the compensating spacer 310; the subscript "a" represents combined parameters of the axial ends 210 of the waveguide 202; the subscript "p" represents combined parameters of the end caps 304,306; the subscript "i" is represents a parameter of the intermediate portion 208 of the waveguide 202; and the subscript "b" represents a parameter of the housing 302.

For example, the elastic displacement of the end caps 304,306, having an outer diameter of 4013 µm and an inner diameter of 1575 µm, is −0.20 µm. The elastic displacement of the compensator seat 310, having an outer diameter of 4013 µm and an inner diameter of 1575 µm, is −0.10 µm. The elastic expansion of each axial end 210 of the optical waveguide 202, having an outer diameter of 2007 µm, is −0.51 µm. The elastic expansion of the intermediate portion 208 of the optical waveguide 202, having an outer diameter of 813 µm, is −14.74 µm. The elastic expansion of the compensating spacer 310, having an outer diameter of 3429 µm and an inner diameter of 1575 µm, is −1.84 µm.

Therefore, according to equation (1), the net displacement ($\delta_n$) of each component, which is identified by stations (ST0–ST7) noted in FIG. 20, is as follows:

Station 0: $\delta_{net}$=0.00 µm
Station 1: $\delta_{net}$=5.52 µm+(−0.20 µm)=5.32 µm
Station 2: $\delta_{net}$=0.17 µm+(−0.51 µm)=−0.34 µm
Station 3: $\delta_{net}$=0.77 µm+(−14.74 µm)=−13.97 µm
Station 4: $\delta_{net}$=0.17 µm+(−0.51 µm)=−0.34 µm
Station 5: $\delta_{net}$=2.76 µm+(−0.10 µm)=2.66 µm
Station 6: $\delta_{net}$=56.46 µm+(−1.84 µm)=54.62 µm
Station 7: $\delta_{net}$=5.52 µm+(−0.20 µm)=5.32 µm The total net displacement of all the components (i.e., displacement between ST0 and ST7) is 53.28 µm.

Figure 21:
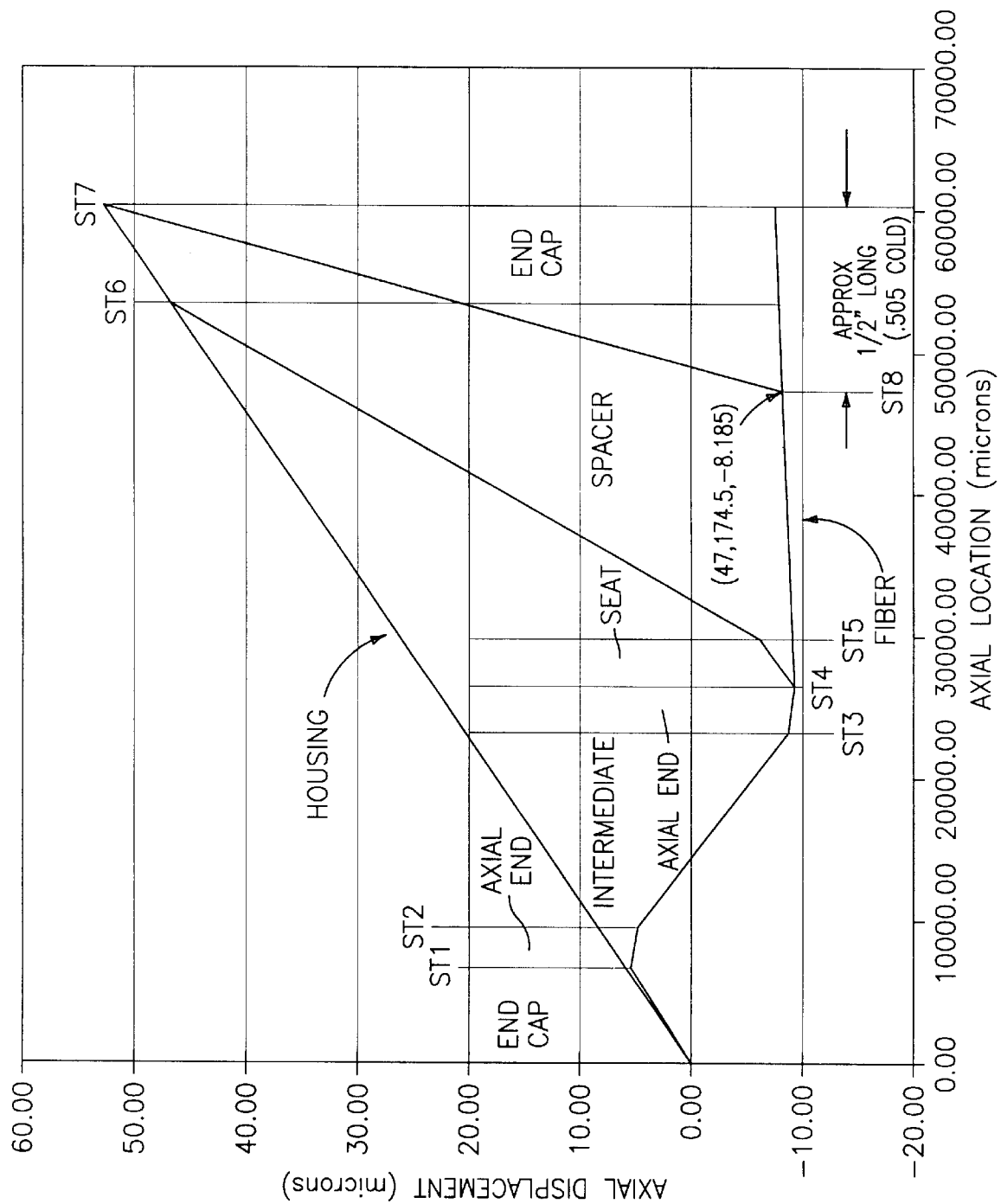
FIG. 21 is a graph of the displacement of the athermal device of FIG. 20 at 100° C. delta, in accordance with the present invention.

FIG. 21 graphically illustrates the net axial displacement (µm) determined above versus the axial location (µm) along the athermal device 400 at 100° C. delta. As shown, the displacement, which the strain relief ferrule 324 must compensate for to prevent stress or tension on the pigtail, is approximately equal to the net displacement between station 4 and station 7, which equals approximately 62.60 µm. Note that the optical fiber 216 has a thermal displacement of −1.85 µm over the length between station 4 and station 7, which is approximately 33,655 µm. The displacement of the optical fiber 216, therefore, reduces the amount of displacement necessary for the strain relief ferrule to expand to approximately 61.38 µm. According to equation (2), the length of the strain relief ferrule 324 is approximately 12,400 µm to compensate for 61.38 µm of displacement, wherein the ferrule is formed of a polyimide material having a CTE of 4.95E-05.

The drawings and calculations presented address one side of the embodiment of FIG. 18, but as shown, can be applied to both ends of the athermal device 400. In the embodiment shown in FIG. 20, the connection of the optical waveguide 202 and right pigtail assembly 214 at station 4 (ST 4) displaces approximately 61.38 µm at 100° C. delta relative to the right end of the athermal device at station 7 (ST7) and bonded to the ferrule 324 at station 8 (ST 8). As the temperature rises, the ferrule 324 expands towards the left end of the athermal device 400 towards station 0 (ST0), hence moving the attachment point of the fiber 216 itself. This results in a near zero strain minus the small amount of expansion of the fiber in the pigtail over a wide temperature range. Any pull forces on the fiber 216 are transferred axially through the ferrule 324 and back to the housing 302, and therefore, the tube must be sized to sufficiently stiff and rigid to this type of compressive loading.

The assembly of the strain relief assembly 320 to the housing 302 is performed at a temperature greater than the maximum operating temperature (e.g. >100° C.) to ensure minimal stress on the waveguide/pigtail assembly interface. Further, the length of the ferrule 324 is reduced by a predetermined amount (e.g., approximately 20%) of its calculated length to provide constant slack in the fiber 216 throughout the operating temperature range, and thereby compensate for any tolerances in the components. While the reduction of the length of the ferrule provides slack in the optical fiber 214, the amount of slack should not cause the fiber to contact the walls of the compensating spacer 310, which may result in micro-bending and/or bending stresses to the fiber.

While the seats of the end caps and compensating elements for receiving the axial ends of the waveguide are generally tapered or frusta-conical in shape, one will recognize that the seat may be of any different shapes and geometries, such as rounded, hexagonal and flat.

While the athermal devices described hereinbefore have both a compensating spacer and end caps, one will recognize and appreciate that one or both of the end caps may also function as a compensating spacer, thus eliminating the discrete compensating spacer.

Figure 22:
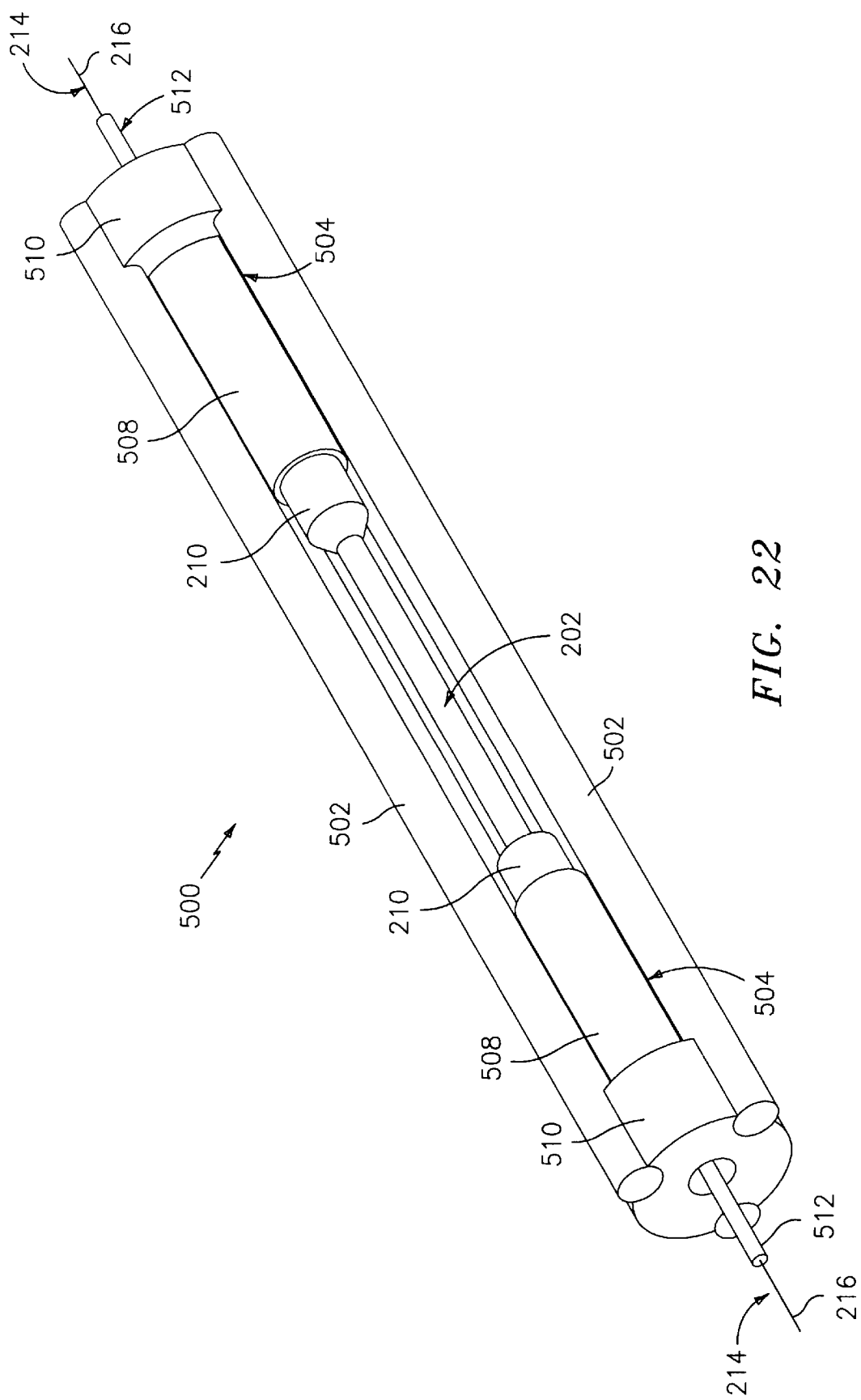
FIG. 22 is a perspective view of another embodiment of an athermal device, in accordance with the present invention.

For example, as shown in FIG. 22, another embodiment of an athermal optical device embodying the present invention is illustrated. The waveguide 202 and the pigtail assemblies 214 are the same as that shown in FIG. 15, and therefore, the reference numbers are the same. The athermal device 300 is illustrative of an embodiment having a plurality of support rods 502, a pair of compensating end caps 504 attached to the end portions of the supports rods, which support the optical waveguide 202 therebetween. The support rods function as the housing as described hereinbefore.

The support rods 502 may be formed of a high strength metal or metal alloy material, preferably having a low CTE that is higher than silica, such as 400 Series stainless steel, titanium, nickel-iron alloys, such as Super Invar®, Carpenter Invar®, Free-Cut Invar® (registered trademarks of Carpenter Technology Corporation) containing various levels of carbon, manganese, silicon, nickel, cobalt and iron and selenium, or high strength, low CTE materials. While the support rods are preferably formed of material having a low CTE, other material may be used having higher CTEs, such as nickel-based alloys, such as Inconel®, Incoloy®, and Nimonic® (registered trademarks of Inco Alloys International, Inc.) containing various levels of nickel, carbon, chromium, iron, molybdenum and titanium (e.g., Inconel 625). While a material having a relatively low CTE is preferred, one will appreciate and recognize that any high strength material, having a higher CTE, may be used with the understanding that the dimensions of the packaging (i.e., support rods) is dependent on the CTE of the material.

Both compensating end caps 504 include an inner portion 508 and an outer portion 510, which has an outer diameter greater than the inner portion. The compensating end caps 504 include a bore disposed axially for receiving the pigtail assembly 214 therethrough. The inner end of the end caps 504 has an axial counter bore, that is frusta-conical in shape, to provide a seat for receiving and locating respective axial ends 210 and nub (not shown) of the optical waveguide 202. The bore has a sufficient diameter to assure than no contact occurs between the end caps and the fiber 216 during expansion and contraction of the athermal device 500, as described hereinbefore.

The end portions of the supporting rods 502 are welded to the outer portions of the end caps 510. Preferably, at least three rods, which are radially spaced equally, are used to provide three points of contact between the end caps and supporting rods to enable the end caps to be more easily aligned concentrically. Additionally, the spacing between the support rods enable visual verification of the axial alignment of end caps 504 and waveguide 202 during assembly.

The compensating end caps 504 are formed of a metal or metal alloy, such as steel, stainless steel, aluminum, high expansion alloy, such as High Expansion "19-2"®, High Expansion "22-3"®, High Expansion "72"®, (registered trademark of Carpenter Technology Corporation) containing various levels of carbon, manganese, silicon, chromium, nickel, iron, and copper, or other material having a higher coefficient of thermal expansion (CTE) than the supporting rods 502. The CTEs and lengths of the optical waveguide 202 and the end caps 504 are selected such that the reflection wavelength of the grating 204 does not substantially change over a predetermined temperature range (i.e., 100° C.). More specifically, the length of the end caps 504 are sized to offset the upward grating wavelength shift due to temperature and the thermal expansion of the supporting rods 502 and waveguide, as will be described hereinbefore. As the temperature increases, each end caps' length expands faster than the optical waveguide, which shifts the grating wavelength down to balance the intrinsic wavelength shift up with increasing temperature.

The athermal device 500 includes a strain relief assembly 512, similar to the strain relief assembly 234 as described hereinbefore, mounted within the compensating end caps 504 for relieving strain to the pigtail assemblies 214 at the waveguide/pigtail assembly interface; resulting from the thermal expansion and contraction of the supporting rods 502, the end caps and the optical waveguide 202.

Alternatively, the supporting rods 502 may be substituted for a cylindrical housing or shell, similar to that described hereinbefore. Further, the cylindrical housing may have a plurality of radially, spaced slots or elongated openings to provide visual verification of the alignment of the end caps 504 and waveguide 202.

It should be understood that, unless otherwise stated herein, any of the features, characteristics, alternatives or modifications described regarding a particular embodiment herein might also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A temperature compensated optical device, comprising:
   an optical element, having at least one grating disposed therein along a longitudinal axis of said optical element, said grating having a characteristic wavelength that varies with ambient temperature and upon the exertion of axial compressive force applied to said optical element, said optical element being made of an element material having an element coefficient of thermal expansion (CTE);
   a spacer disposed adjacent to an axial end of said optical element and made of a spacer material having a spacer CTE that is larger than the element CTE;
   a housing arranged with said spacer and said optical element such that at least a portion of said spacer and said optical element are in compression over an operational temperature range, said housing having a housing CTE that is less than said spacer CTE; and
   said characteristic wavelength changing less than a predetermined amount over said operational temperature range.

2. The apparatus of claim 1 wherein said housing comprises an end cap disposed adjacent to one axial end of said spacer.

3. The apparatus of claim 2 wherein said housing comprises a outer shell fused to said end cap at one axial end and fused to an opposite axial end of said element.

4. The apparatus of claim 2 wherein said spacer material, said optical element, and said end cap are fused together as a monolithic device.

5. The apparatus of claim 1 wherein at least a portion of the optical element has a transverse cross-section which is continuous and is formed of substantially the same material, and the at least portion of the optical element has an outer transverse dimension of at least 0.3 mm.

6. The apparatus of claim 1 wherein said optical element comprises:
   an optical fiber, having said grating embedded therein; and
   a tube, having said optical fiber and said grating encased therein along a longitudinal axis of said tube, said tube being fused to at least a portion of said fiber.

7. The apparatus of claim 6 wherein said tube is fused to said optical fiber where said grating is located.

8. The apparatus of claim 6 wherein said tube is fused to said optical fiber on opposite axial sides of said grating.

9. The apparatus of claim 6, wherein said device further comprises a plurality of said optical fibers encased in said tube.

10. The apparatus of claim 1 wherein said optical element comprises a large diameter optical waveguide having an outer cladding and an inner core disposed therein.

11. The apparatus of claim 10, wherein said device further comprises a plurality of said cores disposed in said waveguide.

12. The apparatus of claim 1 wherein said optical element comprises:
  a tube fused to at least a portion of an optical fiber along a longitudinal axis of said tube;
  a large diameter optical waveguide having an outer cladding and an inner core disposed therein; and
  said tube and said Waveguide being axially fused and optically coupled together.

13. The apparatus of claim 12 wherein said grating is disposed in said fiber and encased in said tube along said longitudinal axis of said tube.

14. The apparatus of claim 12 wherein said grating is disposed in said optical waveguide.

15. The apparatus of claim 1 wherein said element material comprises a glass material.

16. The apparatus of claim 1, wherein said element has a plurality of gratings disposed therein.

17. The apparatus of claim 1, wherein said optical element has at least one pair of gratings disposed therein and at least a portion of said optical element is doped with a rare-earth dopant between said pair of gratings to form a laser.

18. The apparatus of claim 17 wherein said laser lases at a lasing wavelength which changes as axial force on said optical element changes.

19. The apparatus of claim 1, wherein at least a portion of said optical element is doped with a rare-earth dopant where said grating is located and said grating is configured to form a DFB laser.

20. The apparatus of claim 19 wherein said DFB laser lases at a lasing wavelength which changes as force on said element changes.

21. The apparatus of claim 1, wherein said element material comprises silica.

22. The apparatus of claim 1 wherein at least a portion of said element comprises a cylindrical shape.

23. The apparatus of claim 1 wherein said element comprises a shape that provides a predetermined sensitivity to a shift in said characteristic wavelength due to a change in force on said element.

24. The apparatus of claim 23 wherein said shape of said element comprises a dogbone shape.

25. The apparatus of claim 1 further comprising an actuator which provides an axial force on said optical element to set said characteristic wavelength of said grating.

26. The apparatus of claim 1 wherein said compression of said element remains in a linear spring region over said operational temperature range.

27. The apparatus of claim 1 wherein said spacer material comprises a metal.

28. The apparatus of claim 1 wherein said spacer material comprises aluminum.

29. The apparatus of claim 1 wherein said spacer material and said optical element are made of a glass material.

30. The apparatus of claim 1, wherein the optical element comprises a cane waveguide.

31. A temperature compensated optical device, comprising:
  an optical waveguide having a cladding and a core disposed along a longitudinal axis of the optical waveguide, the optical waveguide further including at least one grating disposed within the core, the grating having a characteristic wavelength that varies with ambient temperature and upon the exertion of axial compressive force applied to the optical waveguide, the optical waveguide being of an element material having a waveguide coefficient of thermal expansion (CTE), at least a portion of the cladding and the core of the optical waveguide having a transverse cross-section which is continuous and is formed of substantially the same material, the at least portion of the cladding and the core of the optical waveguide having an outer transverse dimension of at least 0.3 mm; and
  a compression device including a first member and a second member, the first member including a material having a first coefficient of thermal expansion (CTE), the second member including a material having a second coefficient of thermal expansion (CTE) that is different than the first CTE of the first member,
  the first and second members being arranged in thermally compensating relationship with the optical waveguide such that the characteristic wavelength is maintained within a predetermined wavelength range over an ambient temperature range.

32. The optical device of claim 31 wherein the first CTE is greater than the waveguide CTE; and the second CTE is less than the first CTE.

33. The optical device of claim 31, wherein the compression of the optical waveguide remains in a linear spring region over the operational temperature range.

34. The optical device of claim 31 wherein the first member comprises a housing; and
  the second member comprises a spacer, wherein the spacer and the optical waveguide are disposed within the housing in compressive relationship.

35. The optical device of claim 34, wherein the spacer comprises a metal.

36. The optical device of claim 34, wherein the spacer comprises a glass material.

37. The optical device of claim 34, further including a pair of end caps attached to the housing that maintain the spacer and optical waveguide within the housing in compressive relationship.

38. The optical device of claim 34 wherein the housing comprises a first end cap disposed adjacent to one axial end of the spacer; and a second end cap disposed adjacent to one axial end of the optical waveguide.

39. The optical device of claim 31, wherein the first member comprises a housing having a first end cap; and
  the second member comprises a second end cap attached to the housing;
  whereby the waveguide is disposed in a compressive state between the first and second end caps.

40. The optical device of claim 39, wherein the first end cap is formed of the same material as the housing.

41. The optical device of claim 39, wherein the first end cap is formed of the same material as the second end cap.

42. The optical device of claim 39, wherein the housing is tubular.

43. The optical device of claim 39, wherein the housing comprises a plurality of rods.

44. The optical device of claim 31, further comprising an actuator that provides an axial force on the optical waveguide.

45. The optical device of claim 44, wherein the actuator includes at least one of a piezoelectric actuator, a stepper motor and a magnetostrictive device.

46. The optical device of claim 31, wherein the optical waveguide is single mode.

47. The optical device of claim 31 wherein the cladding and the core are formed of substantially homogeneous material.

48. The optical device of claim 31, wherein the cladding and the core comprises silica.

49. The optical device of claim 31, wherein the optical waveguide further comprises a plurality of the cores disposed in the cladding.

50. The optical device of claim 31, wherein the optical waveguide has a plurality of gratings disposed in the core.

51. The optical device of claim 31, wherein at least a portion of the optical waveguide comprises a cylindrical shape.

52. The optical device of claim 31, wherein the optical waveguide comprises a shape that provides a predetermined sensitivity to a shift in the characteristic wavelength due to a change in force on the optical waveguide.

53. The optical device of claim 31, wherein a shape of the optical waveguide comprises a dogbone shape.

54. The optical device of claim 31, wherein the outer transverse dimension of the at least portion of the cladding and the core of the optical waveguide is at least about the dimension selected from the group consisting of 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

55. The optical device of claim 31, wherein the optical waveguide has at least one pair of gratings disposed in the core and at least a portion of the optical waveguide is doped with a rare-earth dopant between the pair of gratings to form a laser.

56. The optical device of claim 55 wherein the laser lases at a lasing wavelength that changes as axial force on the optical waveguide changes.

57. The optical device of claim 31, wherein at least a portion of the optical waveguide is doped with a rare-earth dopant where the grating is located and the grating is configured to form a DFB laser.

58. The optical device of claim 57 wherein the DFB laser lases at a lasing wavelength which changes as force on the optical waveguide changes.

59. The optical device of claim 31, wherein the optical element comprises a cane waveguide.

60. The optical device of claim 31, wherein the cladding and the core comprises a glass material.

61. A temperature compensated optical device, comprising:
- an optical waveguide having a cladding and a core disposed along a longitudinal axis of the optical waveguide, the optical waveguide further including at least one grating disposed within the core, the grating having a characteristic wavelength that varies with ambient temperature and upon the exertion of axial compressive force applied to the optical waveguide, the optical waveguide being of a material having a waveguide coefficient of thermal expansion (CTE), at least a portion of the cladding and the core of the optical waveguide having a transverse cross-section which is continuous and is formed substantially the same material, the at least portion of the cladding and the core of the optical waveguide having an outer transverse dimension of at least 0.3 mm; and
- a compression device including a first member and a second member, the first member including a material having a first coefficient of thermal expansion (CTE), the second member including a material having a second coefficient of thermal expansion (CTE) that is different than the first CTE of the first member,
- whereby the compression device strains the optical waveguide in response to a change in ambient temperature such that the characteristic wavelength is maintained within a predetermined wavelength range over an ambient temperature range.

62. The optical device of claim 61, wherein the optical element comprises a cane waveguide.

63. The optical device of claim 61, wherein the cladding and the core comprises a glass material.

64. The optical device of claim 60, wherein the outer transverse dimension of the at least a portion of the cladding and the core of the optical waveguide is at least about the dimension selected from the group consisting of 0.3 mm, 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

65. A temperature compensated optical device, comprising:
- an optical waveguide having a cladding and a core disposed along a longitudinal axis of the optical waveguide, the optical waveguide further including at least one grating disposed within the core, the grating having a characteristic wavelength that varies with ambient temperature and upon the exertion of axial compressive force applied to the optical waveguide, the optical waveguide being of a material having a waveguide coefficient of thermal expansion (CTE), ), the optical waveguide comprising an optical fiber having the grating embedded therein, and a tube having the optical fiber and the grating encased therein along a longitudinal axis of the tube, the tube being fused to at least a portion of the optical fiber; and
- a compression device including a first member and a second member, the first member including a material having a first coefficient of thermal expansion (CTE), the second member including a material having a second coefficient of thermal expansion (CTE) that is different than the first CTE of the first member,
- the first and second members being arranged in thermally compensating relationship with the optical waveguide such that the characteristic wavelength is maintained within a predetermined wavelength range over an ambient temperature range.

66. The optical device of claim 65 wherein the tube is fused over a portion of the optical fiber having the grating embedded therein.

67. A temperature compensated optical device, comprising:
- an optical waveguide having a cladding and a core disposed along a longitudinal axis of the optical waveguide, the optical waveguide further including at least one grating disposed within the core, the grating having a characteristic wavelength that varies with ambient temperature and upon the exertion of axial compressive force applied to the optical waveguide, the optical waveguide being of a material having a waveguide coefficient of thermal expansion (CTE), the optical waveguide including a pair of opposing axial surfaces, at least a portion of the cladding and the core of the optical waveguide having a transverse cross-section which is continuous and is formed of substantially the same material; and
- a compression device including a first member and a second member, the first member including a material having a first coefficient of thermal expansion (CTE), the second member including a material having a second coefficient of thermal expansion (CTE) that is different than the first CTE of the first member, the first and second members being arranged in thermally compensating relationship with the optical waveguide such that the characteristic wavelength is maintained within a predetermined wavelength range over an ambient temperature range.

68. The optical device of claim 67, wherein the outer transverse dimension of the at least a portion of the cladding and the core of the optical waveguide is at least about the dimension selected from the group consisting of 0.3 mm, 0.4 mm, 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, and 5.0 mm.

69. The optical device of claim 67, wherein the optical element comprises a cane waveguide.

70. The optical device of claim 67, wherein the cladding and the core comprises a glass material.

71. A temperature compensated optical device, comprising:

an optical waveguide having a cladding and a core disposed along a longitudinal axis of the optical waveguide, the optical waveguide further including at least one grating disposed within the core, the grating having a characteristic wavelength that varies with ambient temperature and upon the exertion of axial compressive force applied to the optical waveguide, the optical waveguide being of a material having a waveguide coefficient of thermal expansion (CTE), the optical waveguide having an outer transverse dimension such that the optical waveguide will not buckle over an operational temperature range, and at least a portion of the optical waveguide has a transverse cross-section which is continuous and made of substantially homogeneous material; and a compression device including a first member and a second member, the first member including a material having a first coefficient of thermal expansion (CTE), the second member including a material having a second coefficient of thermal expansion (CTE) that is different than the first CTE of the first member, the first and second members being arranged in thermally compensating relationship with the optical waveguide such that the characteristic wavelength is maintained within a predetermined wavelength range over an ambient temperature range.

\* \* \* \* \*